United States Patent [19]
Nishizawa et al.

[11] Patent Number: 5,732,298
[45] Date of Patent: Mar. 24, 1998

[54] PICTURE FRAME SWITCHING MECHANISM

[75] Inventors: Akio Nishizawa, Kawasaki; Isao Soshi, Tokyo; Shuji Iijima, Yamato; Noriyasu Kotani, Tokyo; Junichi Omi, Kawasaki, all of Japan

[73] Assignee: Nikon Corporation, Tokyo, Japan

[21] Appl. No.: 684,850

[22] Filed: Jul. 25, 1996

Related U.S. Application Data

[63] Continuation-in-part of Ser. No. 569,906, Dec. 8, 1995, abandoned.

[30] Foreign Application Priority Data

| Dec. 9, 1994 | [JP] | Japan | 6-306336 |
| Dec. 9, 1994 | [JP] | Japan | 6-306337 |
| Dec. 28, 1994 | [JP] | Japan | 6-329093 |
| Apr. 13, 1995 | [JP] | Japan | 7-088310 |
| Apr. 13, 1995 | [JP] | Japan | 7-088311 |
| Jul. 25, 1995 | [JP] | Japan | 7-189066 |
| Sep. 1, 1995 | [JP] | Japan | 7-225031 |

[51] Int. Cl.$^6$ ............................................ G03B 13/10
[52] U.S. Cl. ................................................... 396/380
[58] Field of Search ........................................ 396/380

[56] References Cited

U.S. PATENT DOCUMENTS

| 2,149,384 | 3/1939 | Becker | 396/380 |
| 2,157,547 | 5/1939 | Leitz | 396/380 |
| 3,011,385 | 12/1961 | Frost | 396/380 |

FOREIGN PATENT DOCUMENTS

| 5-281596 | 10/1993 | Japan | 396/380 |

Primary Examiner—Russell E. Adams
Attorney, Agent, or Firm—Oliff & Berridge, PLC

[57] ABSTRACT

The picture frame switching mechanism according to the present invention includes: a plurality of picture frame definition members whose relative position in a plane perpendicular to an optical axis of an optical system is changed so as to switch picture frames; a drive section which drives a portion of the plurality of picture frame definition members; and a linked driving section which drives other portion of the picture frame definition members in linkage according to predetermined conditions with driving of the portion of the picture frame definition members.

44 Claims, 31 Drawing Sheets

FIG.31A
FIG.31B
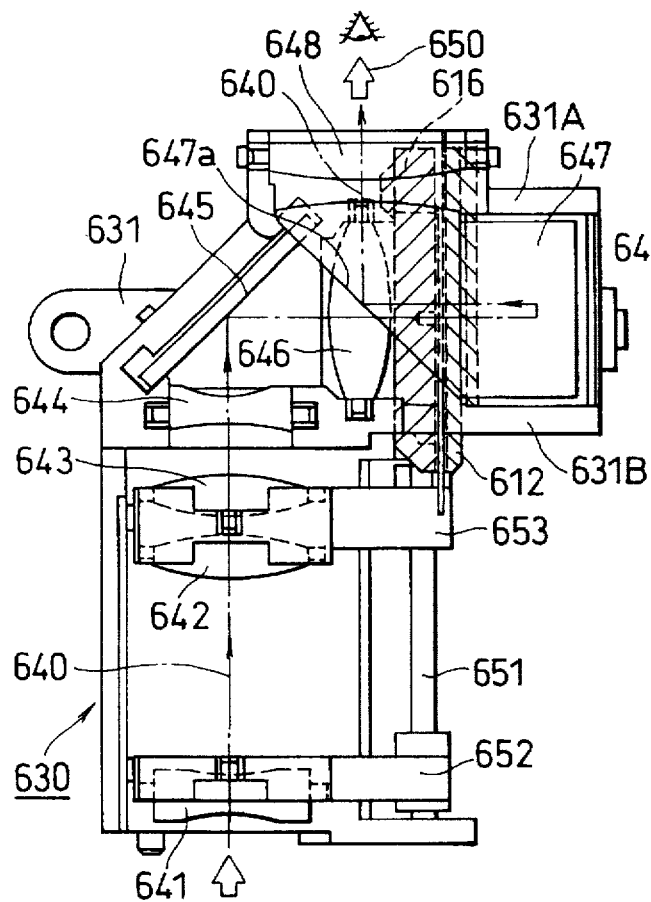
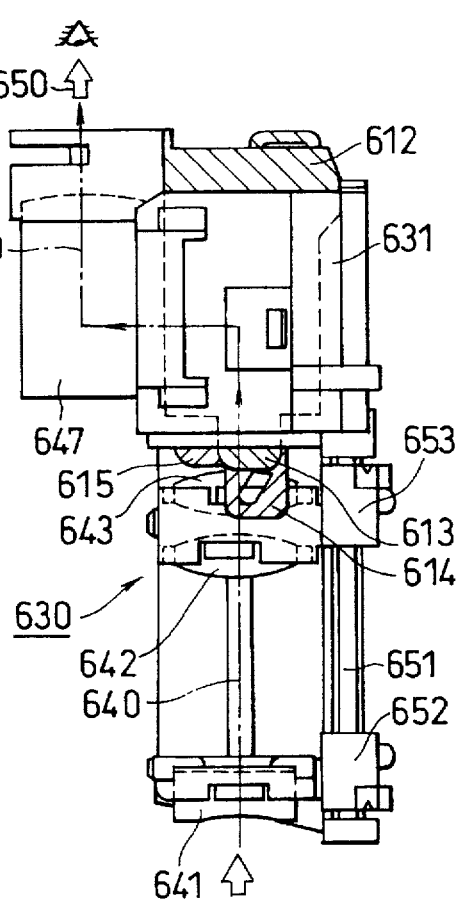
FIG.31C
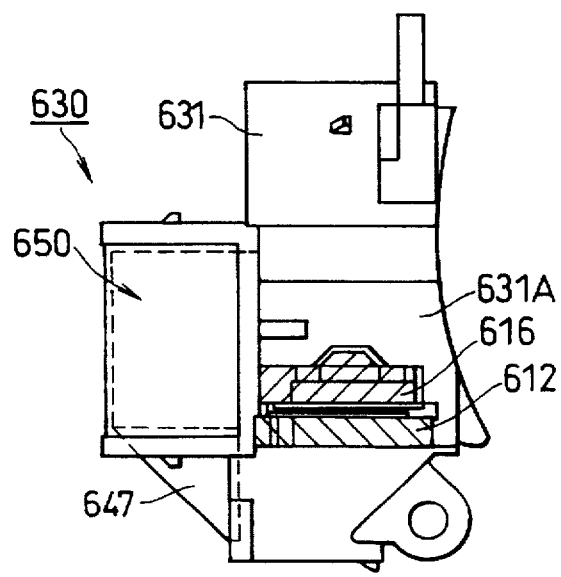

PICTURE FRAME SWITCHING MECHANISM

This is a Continuation-in-Part of application Ser. No. 08/569,906, filed Dec. 8, 1995, now abandoned.

BACKGROUND OF THE INVENTION

1. Field of the Invention

The present invention relates to a mechanism for switching over a picture frame of an optical device, such as the field of view frame of the viewfinder of a camera or the like.

2. Description of the Related Art

As such a type of switching mechanism, there is disclosed, for example in Japanese Patent Laying-Open Publication Serial No. Heisei 4-113341, one in which a common pinion gear is interposed between a pair of racks for picture frame determination members, and this pinion gear is rotated so that the picture frame determination members are moved symmetrically with respect to the optical axis. Further, in Japanese Patent Laying-Open Publication Serial No. Heisei 6-82882 there is disclosed a mechanism in which, as shown in FIG. 21A, FIG. 21B, and FIG. 21C, a pair of L-shaped picture frame determination members are opposingly disposed along the diagonal direction of the viewfinder view and are engaged with a common cam plate, and these picture frame determination members are driven in mutually opposite diagonal directions according to the direction of operation of the cam plate.

In the construction of these FIGS. 21A through 21C, upon a picture frame mask 400 which determines a first picture frame F1 which is rectangular, there are superimposed in order in the direction of the optical axis of the viewfinder (the direction perpendicular to the plane of the drawing paper) a pair of L-shaped picture frame determination members 401 and 402 which are symmetrical with respect to the optical axis of the viewfinder, and a drive wheel 403. The drive wheel 403 is engaged with pins 401a and 402a of the picture frame determination members 401 and 402 respectively, and pins 400a of the picture frame mask 400 are passed through long holes 401b and 402b of the picture frame determination members 401 and 402. When the drive wheel 403 is rotated, the picture frame determination members 401 and 402 move along the long directions of the long holes 401b and 402b, and the first picture frame F1 is trimmed down by the picture frame determination members 401 and 402. FIG. 21A shows the state in which the first picture frame F1 is trimmed down along its short sides so as to determine a second picture frame F2, while FIG. 21C shows the state in which the first picture frame F1 is trimmed down along its long sides so as to determine a third picture frame F3. Further, FIG. 21B shows the state in which both of the picture frame determination members 401 and 402 have been brought so as to avoid the first picture frame F1.

Since in the two types of prior art mechanism described above all of the picture frame determination members are directly moved by a common driving member (the pinion gear or the cam plate), therefore little freedom is available in the design with regard to the correspondence relation between the drive directions of the picture frame determination members and change of the picture frame, whereby change of the picture frame is restricted. That is to say, when the picture frame determination members are driven in the diagonal direction of the picture frame, the picture frame only expands and contracts vertically and horizontally at a fixed change ratio in correspondence to the slope of this direction of movement, and when the types of picture frame have been increased a requirement arises to provide picture frame determination members and their drive means individually in accordance with the type of the picture frame, and this makes the mechanism more complicated.

Further, with the prior art mechanism shown in FIG. 21A through FIG. 21C, when the picture frame determination members 401 and 402 are moved between the three positions which respectively correspond to the three picture frames F1 through F3, the first picture frame F1 is obtained by the second (middle) in the order of the guiding of the picture frame determination members 401 and 402 by the pins 400a and the long holes 401b and 402b. For this reason, when switching over between the second picture frame F2 and the third picture frame F3, the picture frame determination members 401 and 402 are required to pass through their positions which correspond to the first picture frame F1. When switching over between the second picture frame F2 and the third picture frame F3, the picture frame determination members 401 and 402 must either encroach into beyond the long sides or beyond the short sides of the first picture frame F1, while avoiding the others of these long sides and short sides; but with the above described arrangement, at the en route stage (the FIG. 21B stage) at which the first picture frame F1 is obtained, the picture frame determination members 401 and 402 have already been brought sufficiently thus to avoid, and by the subsequent avoiding motion the picture frame determination members 401 and 402 are removed from the first picture frame F1 more than is necessary. Accordingly, the space required for disposition of this picture frame switching mechanism is unnecessarily expanded in the upwards, downwards, leftwards, and rightwards directions of the picture frames F1 through F3, and this becomes a point which renders it more difficult to make the camera compact.

Further, with the picture frame switching mechanism of FIG. 21A through FIG. 21C, the center of rotation of the drive wheel 403 is positioned within the first picture frame F1. For this reason, a large drive wheel 403 becomes necessary in order to surround the first picture frame F1 around its four sides, which makes the mechanism larger in size. Further, since it is not possible to support the drive wheel 403 at the position of its center of rotation, there is also a danger that smooth operation of the drive wheel 403 cannot be guaranteed because its stability is poor.

SUMMARY OF THE INVENTION

The objective of the present invention is to propose a picture frame switching mechanism which can cope with many types of picture frame easily and in a compact manner.

In order to attain this objective, the picture frame switching mechanism of the present invention comprises: a plurality of picture frame definition members whose relative position in a plane perpendicular to an optical axis of an optical system is changed so as to switch picture frames; a drive section which drives a portion of the plurality of picture frame definition members; and a linked driving section which drives other portion of the picture frame definition members in linkage according to predetermined conditions with driving of the portion of the picture frame definition members.

Further, another picture frame switching mechanism of the present invention comprises: a pair of L-shaped picture frame definition members which are opposingly disposed along the diagonal direction of a rectangular shaped picture frame; and a guide member which guides the picture frame definition members so as to change the picture frame over between a plurality of types by displacing the picture frame definition members in mutually opposite directions in a plane parallel to the picture frame, and by changing the directions of displacement of the pair of picture frame definition members en route of their respective displacements.

Further, another picture frame switching mechanism of the present invention comprises: a first picture frame definition member which defines a rectangular shaped first picture frame; and a second picture frame definition member which is provided so as to be shiftable between an encroaching position in which the second picture frame definition member encroaches into the first picture frame by being superimposed in a direction of an optical axis upon the first picture frame definition member and a withdrawn position in which the second picture frame definition member is withdrawn outside from one side of the first picture frame, and in the encroaching position defines a second picture frame by narrowing down the first picture frame in a first direction parallel to the one side, and when shifted to a central stopping position between the encroaching position and the withdrawn position defines a third picture frame along with the first picture frame definition member by narrowing down the first picture frame in a second direction which is perpendicular to the first direction.

Further, another picture frame switching mechanism of the present invention comprises: a picture frame switching member which is inserted into an optical path of an optical system; and a guide mechanism which guides the picture frame switching member according to a predetermined guiding order between a first position corresponding to a first picture frame which is of rectangular shape, a second position corresponding to a second picture frame which is squeezed in a direction following along short sides of the first picture frame, and a third position corresponding to a third picture frame which is squeezed in a direction following along long sides of the first picture frame, and which performs switching between the second position and the third position not via the first position.

Further, another picture frame switching mechanism of the present invention comprises: a picture frame switching member which is inserted into an optical path of an optical system and which switches between a plurality of picture frames; a drive member which, in a state of being engaged with the picture frame switchover member, is rotationally operated around a rotational axis which is set outside the picture frame and parallel to a direction of an optical axis of the optical system; and a guide mechanism which shifts the picture frame switching member between a plurality of positions respectively corresponding to the plurality of picture frames in linking with a rotation of the drive member.

BRIEF DESCRIPTION OF THE DRAWINGS

FIG. 31A is a sectional view of the case when the picture frame switching mechanism is used in a real image type viewfinder as seen from a direction in the horizontal plane;

FIG. 31B is a side view of the case when the picture frame switching mechanism is used in a real image type viewfinder; and:

FIG. 31C is a rear view of the case when the picture frame switching mechanism is used in a real image type viewfinder.

DESCRIPTION OF THE PREFERRED EMBODIMENT(S)

The embodiments which will be explained hereinafter are picture frame switching mechanisms for a viewfinder optical system which is provided as separate from an optical system for photography of a camera. With this camera, a signal can be recorded upon the recording medium such as a film or the like which indicates the format (the aspect ratio) for use when printing, and this format can be selected from a first format, a second format which is the first format compressed in the direction along its long sides, and a third format which is the first format compressed in the direction along its short sides. When printing, a region determined according to the format which has been recorded, from the image in the exposure region upon the film which is determined by the optical system for photography, is printed upon the photographic paper.

Further, it is also applicable to a picture frame switching mechanism of a viewfinder optical system of a camera which determines the exposure region of the photographic optical system according to a first format, a second format, or a third format, without recording any format signal.

Embodiment 1

Figure 1:
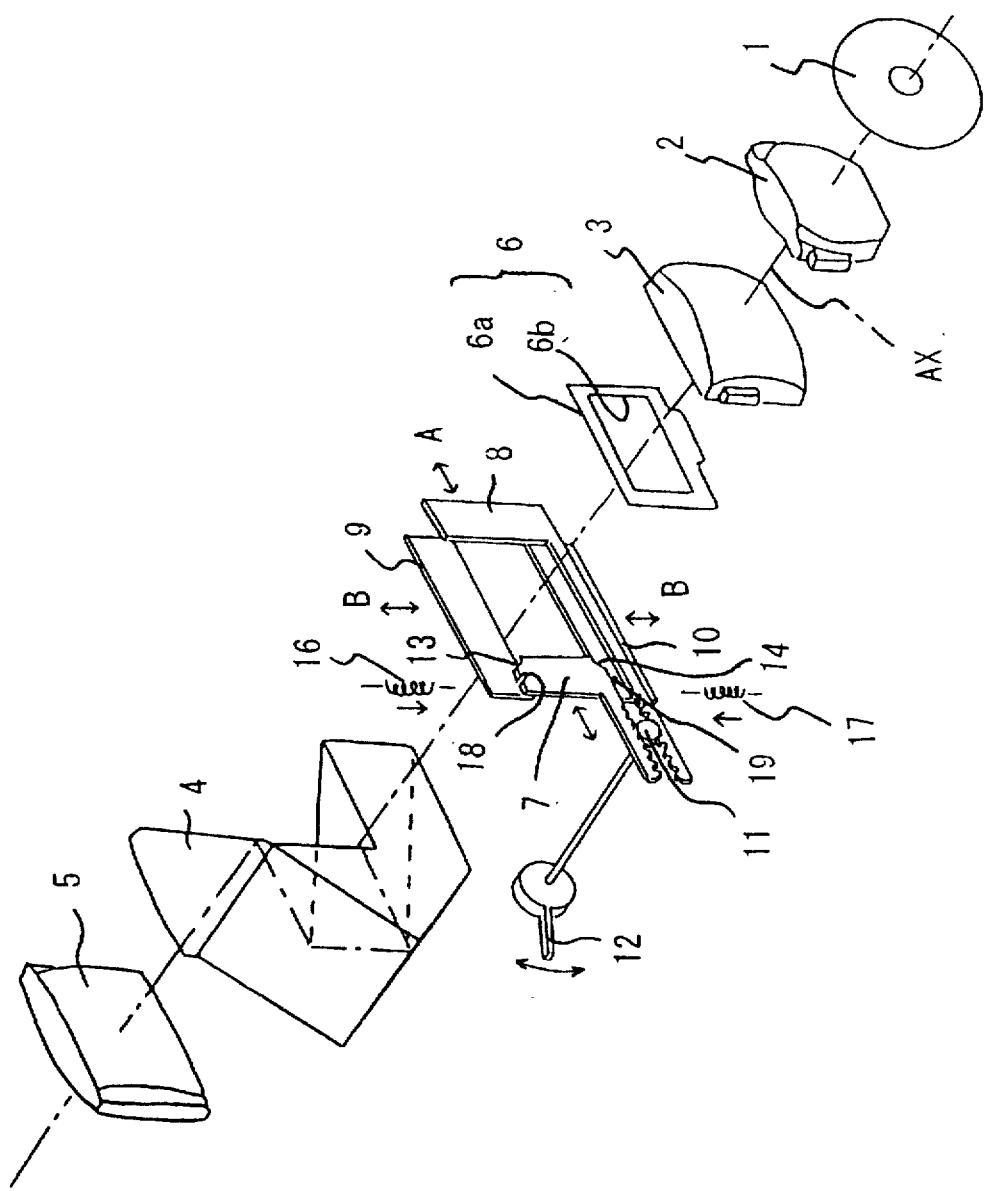
FIG. 1 is a perspective diagram showing an overall structural view of a viewfinder optical system according to the first embodiment of the present invention.

The first embodiment of the present invention will now be explained with reference to FIGS. 1 through 4. FIG. 1 is a perspective diagram showing an overall structural view of a real image type viewfinder optical system of a camera, according to a first embodiment to which the present invention has been applied. 1 is a diaphragm, 2 and 3 are objective lenses, 4 is a prism which inverts the photographic subject image which the objective lenses 2 and 3 have captured top to bottom and left to right, and 5 is an eyepiece lens.

In order selectively to establish in the field of view of the above described eyepiece lens 5 three types of picture frame in correspondence to the selection of the above described three types of format, a single standard frame determination member 6 and four picture frame determination members 7, 8, 9, and 10 are disposed in the vicinity of the focus plane (the real image plane). The standard frame determination member 6 is one which is formed as a basically rectangular shaped opaque body 6a with an opening 6b whose aspect ratio agrees with the above described first format. On the other hand, since the picture frame determination members 7 through 10 are ones for restricting the picture frame determined by the opening 6b of the standard frame determination member 6 (hereinafter termed the "first picture frame") in the direction along its long sides (the direction shown by the arrow A) and in the direction along its short sides (the direction shown by the arrow B), it may be made of any light reducing material (for example ND filter with a transparency ratio of about 10%). Instead of a light reducing member, it is also acceptable to use opaque material in sheet form with a transparency ratio of 0%.

Figure 2:
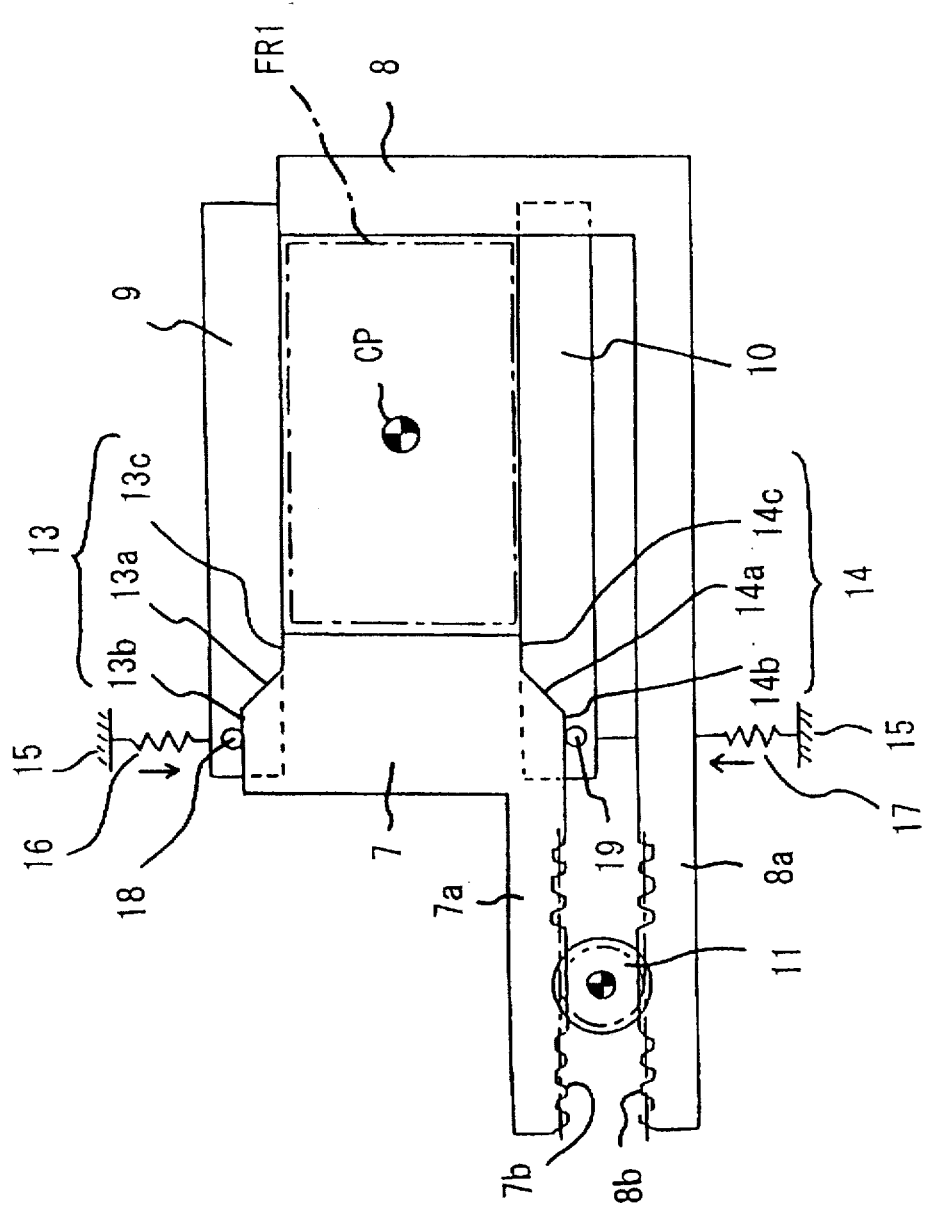
FIG. 2 is a figure showing the state in which a first picture frame is determined in the first embodiment.

As shown in FIG. 2, the picture frame determination members 7 and 8, and the picture frame determination members 9 and 10, are respectively symmetrically disposed in relation to the center CP of the first picture frame FR1. Moreover, this center CP is upon the optical axis AX shown in FIG. 1 of the viewfinder. The left and right picture frame determination members 7 and 8 are supported by a support member not shown in the figure so as to be movable in the direction to approach from the short sides of the first picture frame FR1 towards the center CP or in the direction to move away therefrom, while the up and down picture frame determination members 9 and 10 are supported by a support member not shown in the figure so as to be movable in the direction to approach from the long sides of the first picture frame FR1 towards the center CP or in the direction to move away therefrom. The left and right picture frame determination members 7 and 8 are provided with arm portions 7a and 8a which extend towards the side of the first picture frame FR1, and racks 7b and 8b are formed upon the mutually confronting portions of these arms 7a and 8a. The racks 7b and 8b are engaged with a common pinion gear 11, and this pinion gear 11 is rotationally driven by a picture frame switchover lever 12 (FIG. 1). The picture frame switchover lever 12 may also be used as a selection lever for the above described format signal.

Cam faces 13 and 14 are formed upon the upper and lower rims of the picture frame determination member 7. The picture frame determination members 9 and 10 are always biased towards the center CP of the first picture frame FR1 by compression springs 16 and 17 which are provided between these picture frame determination members 9 and 10 and a fixed member 15 (for example the body of the camera). By these biasing forces, cam pins 18 and 19 which are embedded in the picture frame determination members 9 and 10 are pushed against the cam faces 13 and 14, and thereby the positions of the picture frame determination members 9 and 10 are determined. The cam faces 13 and 14 are formed so as to be symmetrical in the direction B which follows along the short sides of the first picture frame FR1, and have sloping faces 13a and 14a which are displaced towards the center of the picture frame determination member 7 going towards the first picture frame FR1, and flat faces 13b, 13c, 14b, and 14c which are provided as extending parallel to the direction of movement of the picture frame determination member 7 from both its ends.

Figure 3:
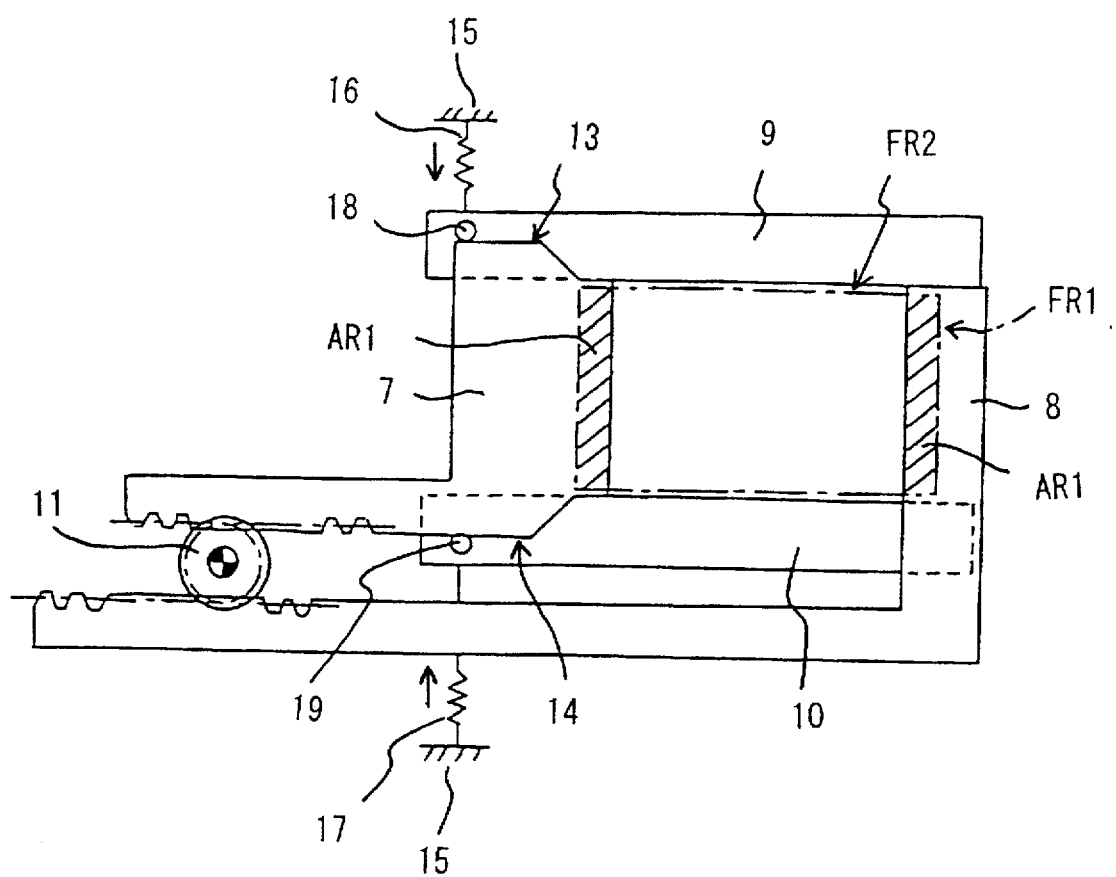
FIG. 3 is a figure showing the state in which a second picture frame is determined in the first embodiment.

With the above construction, when the picture frame switchover lever 12 is kept at the center of its range of movement, as shown in FIG. 2 the picture frame determination members 7 and 8 are kept away from the first picture frame FR1 to the left and right, and the cam pins 18 and 19 are positioned upon the flat faces 13b and 14b of the cam faces 13 and 14, so that the picture frame determination members 9 and 10 are kept away from the first picture frame FR1 to the top and bottom. The first picture frame FR1 which coincides with the opening 6b is displayed in the field of view of the eyepiece lens 5. When from the FIG. 2 position the picture frame switchover lever 12 is operated so as to rotate the pinion gear 11 in the clockwise direction, the picture frame determination members 7 and 8 are advanced as shown in FIG. 3 so as to encroach within the first picture frame FR1, and light reducing regions (the hatched regions in the figure) AR1 are generated at the left and right ends of the first picture frame FR1, with a second picture frame FR2 being determined within them. Moreover, the relationship between the amount of operation of the picture frame switchover lever 12 and the amount of displacement of the picture frame determination members 7 and 8 is set so that the aspect ratio of this second picture frame FR2 agrees with the above described second format.

Figure 4:
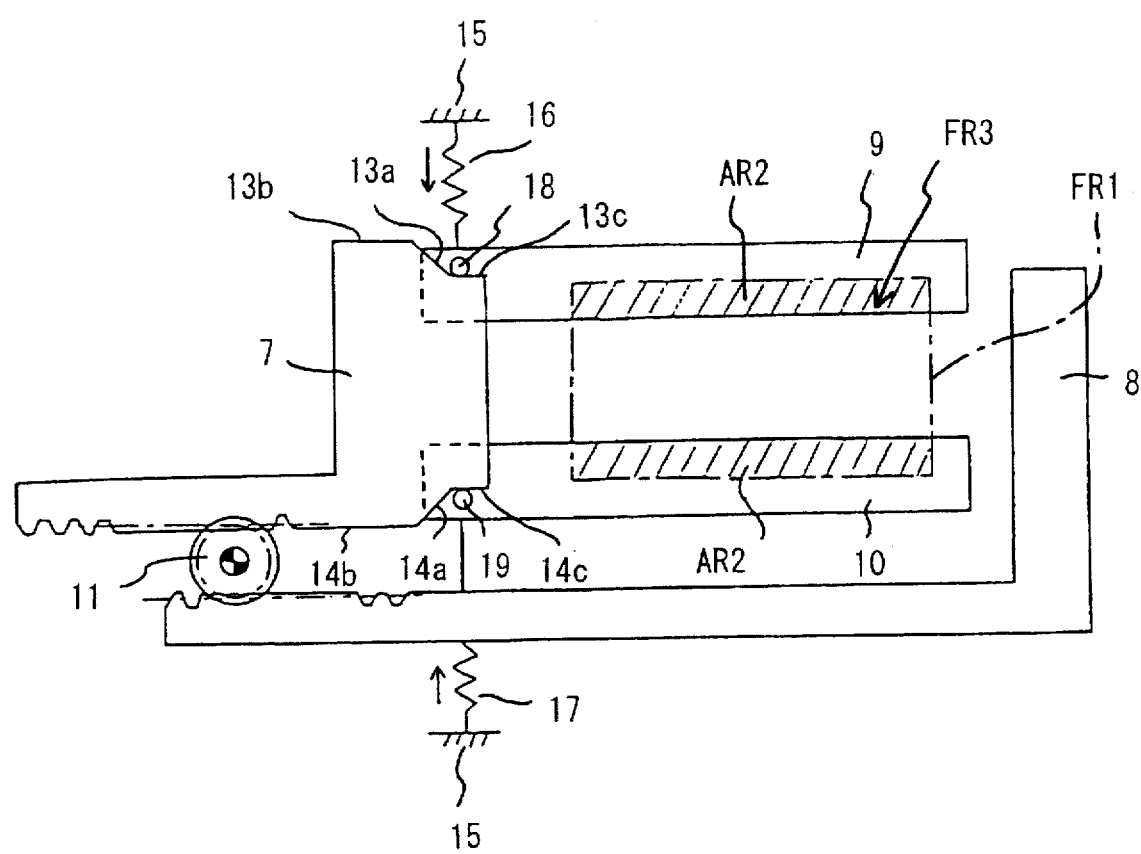
FIG. 4 is a figure showing the state in which a third picture frame is determined in the first embodiment.

On the other hand, when from the FIG. 2 position the picture frame switchover lever 12 is operated so as to rotate the pinion gear 11 in the anticlockwise direction, the picture frame determination members 7 and 8 are further drawn back as shown in FIG. 4 from the first picture frame FR1, and the cam pins 18 and 19 move to the flat faces 13c and 14c via the sloping faces 13a and 14a. Due to this, the picture frame determination members 9 and 10 are advanced so as to encroach within the first picture frame FR1, and light reducing regions (the hatched regions in the figure) AR2 are generated at the top and bottom ends of the first picture frame FR1, with a third picture frame FR3 being determined within them. The short sides of the third picture frame FR3 are formed by the short sides of the opening 6b. The position of the flat faces 13c and 14c of the cam faces 13 and 14 is set so that the aspect ratio of this third picture frame FR3 agrees with the above described third format.

According to the above described first embodiment, it is possible to impart various movements to the picture frame determination members 9 and 10 just by changing the form of the cam faces 13 and 14 and without additionally changing the directions of movement or the amounts of displacement of the picture frame determination members 7 and 8, so that it is easily possible to cope with various picture frames.

Figure 5:
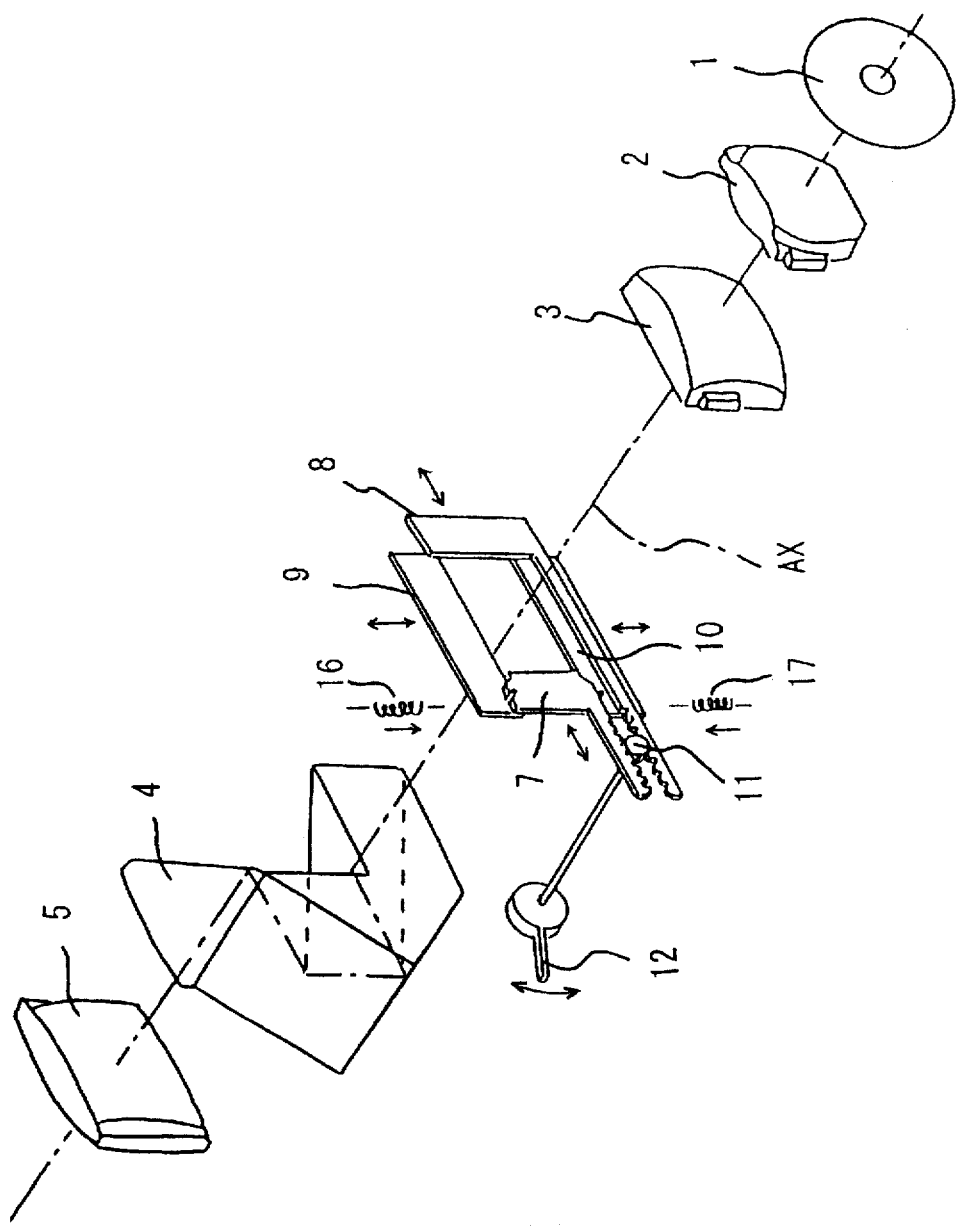
FIG. 5 is a figure showing a variant embodiment from FIG. 1.

Moreover, when the transparency ratio of the picture frame determination members 7 through 10 is suitably set, it is possible to check in the viewfinder picture, in the state shown in FIG. 3, both the first picture frame FR1 and the second picture frame FR2 at the same time, and, in the state shown in FIG. 4, both the first picture frame FR1 and the third picture frame FR3 at the same time. When this is not necessary, it is also acceptable to construct the picture frame determination members 7 through 10 from opaque material. As shown in FIG. 5, it is also acceptable to determine three or more picture frames only with the picture frame determination members 7 through 10, omitting the standard frame determination member 6. It is beneficial to arrange for it to be possible to fix the picture frame switchover lever 12 by a notch mechanism or the like in positions respectively corresponding to the first picture frame FR1, the second picture frame FR2, and the third picture frame FR3. With a camera constructed so that it is possible to change the size of an aperture which is directly in front of the exposure plane of the film, whereby it is also possible to vary the size itself of the photographic picture which is recorded upon the film in correspondence with the above described first through third picture frames, it is possible to link together the movements of the picture frame switchover lever 12 and the aperture.

It would also be acceptable to link together the first determination member and the second determination member by a link mechanism.

Embodiment 2

Figure 6:
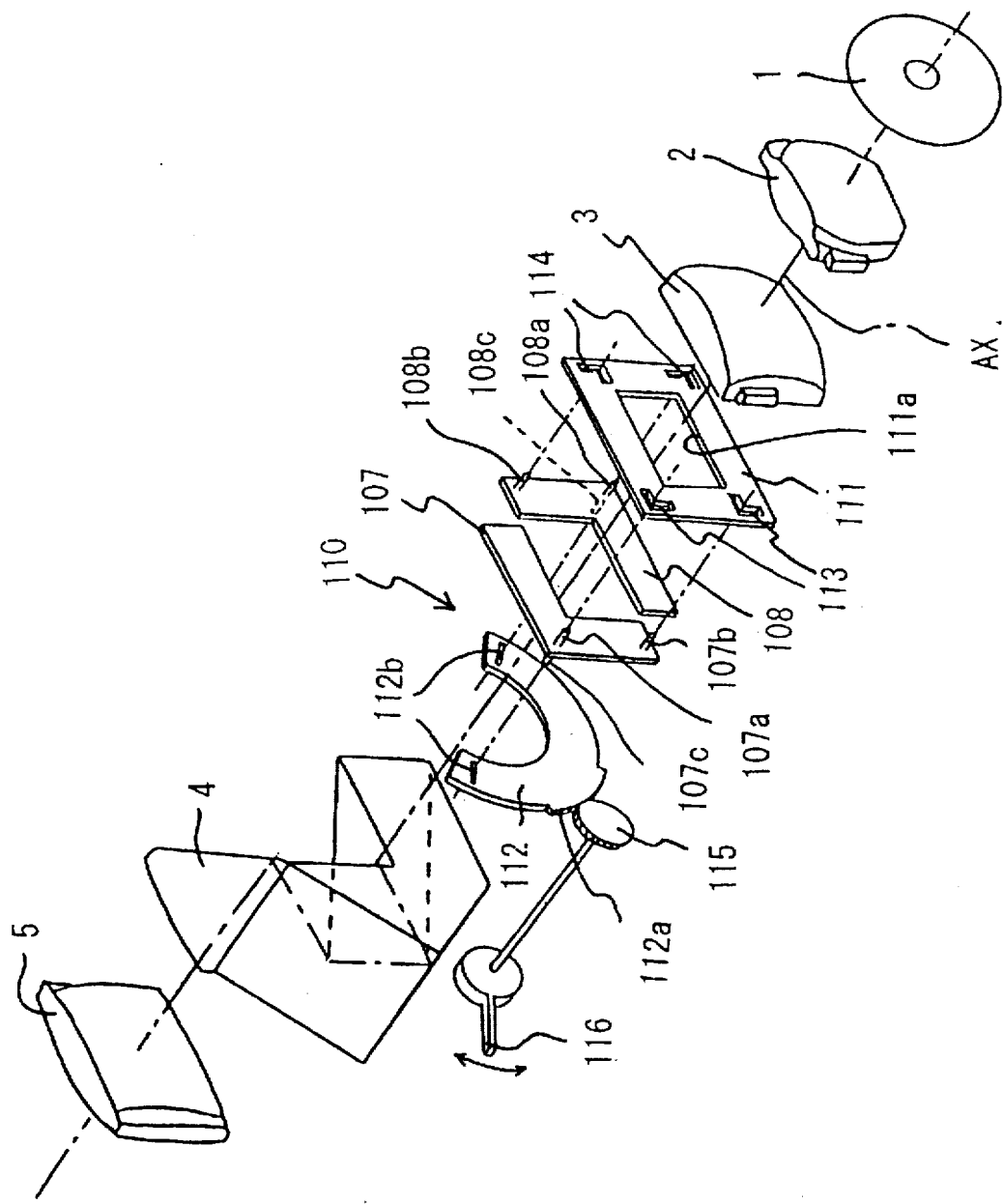
FIG. 6 is a perspective diagram showing an overall structural view of a viewfinder optical system according to the second embodiment of the present invention.

The second embodiment of the present invention will now be explained with reference to FIG. 6 through FIG. 9. FIG. 6 is a perspective diagram showing the overall structure of a real image type viewfinder optical system of a camera of the second embodiment to which the present invention is applied. To parts which are the same as FIG. 1 of the first preferred embodiment the same reference symbols are affixed, and their description will be curtailed.

In correspondence to the one of the above described formats which is selected, there are selectively shown in the field of view of the above described eyepiece lens 5 three types of picture frame: a first picture frame FR1 (FIG. 7) which corresponds to the first format, a second picture frame FR2 (FIG. 8) which corresponds to the second format, and a third picture frame FR3 (FIG. 9) which corresponds to the third format.

As shown in FIG. 6, as well as a pair of L-shaped picture frame determination members 107 and 108 being disposed symmetrically with respect to the optical axis AX on the focal plane (image plane) of the objective lenses 2 and 3, a cam mechanism 110 is provided for driving these picture frame determination members 107 and 108. Cam pins 107a and 107b are provided to the picture frame determination member 107, and cam pins 108a and 108b are provided to the picture frame determination member 108, said cam pins being pierced through these members 107 and 108 and projecting from both their faces. In the following discussion, whenever it is not particularly necessary to distinguish between the picture frames FR1 through FR3, reference will simply be made to "the picture frame FR". Either or both of the picture frame determination members 107 and 108 may be made of a light reducing material (for example ND filter with a transparency ratio of about 10%). Instead of a light reducing member, it is also acceptable to use opaque material in sheet form with a transparency ratio of 0%. The cam mechanism 110 is made up from a cam guide plate 111 which is provided confronting the sides of the picture frame determination members 107 and 108 on the side of the objective lens 3, and a cam drive plate 112 which is provided confronting the sides of the picture frame determination members 107 and 108 on the side of the prism 4.

Figure 7:
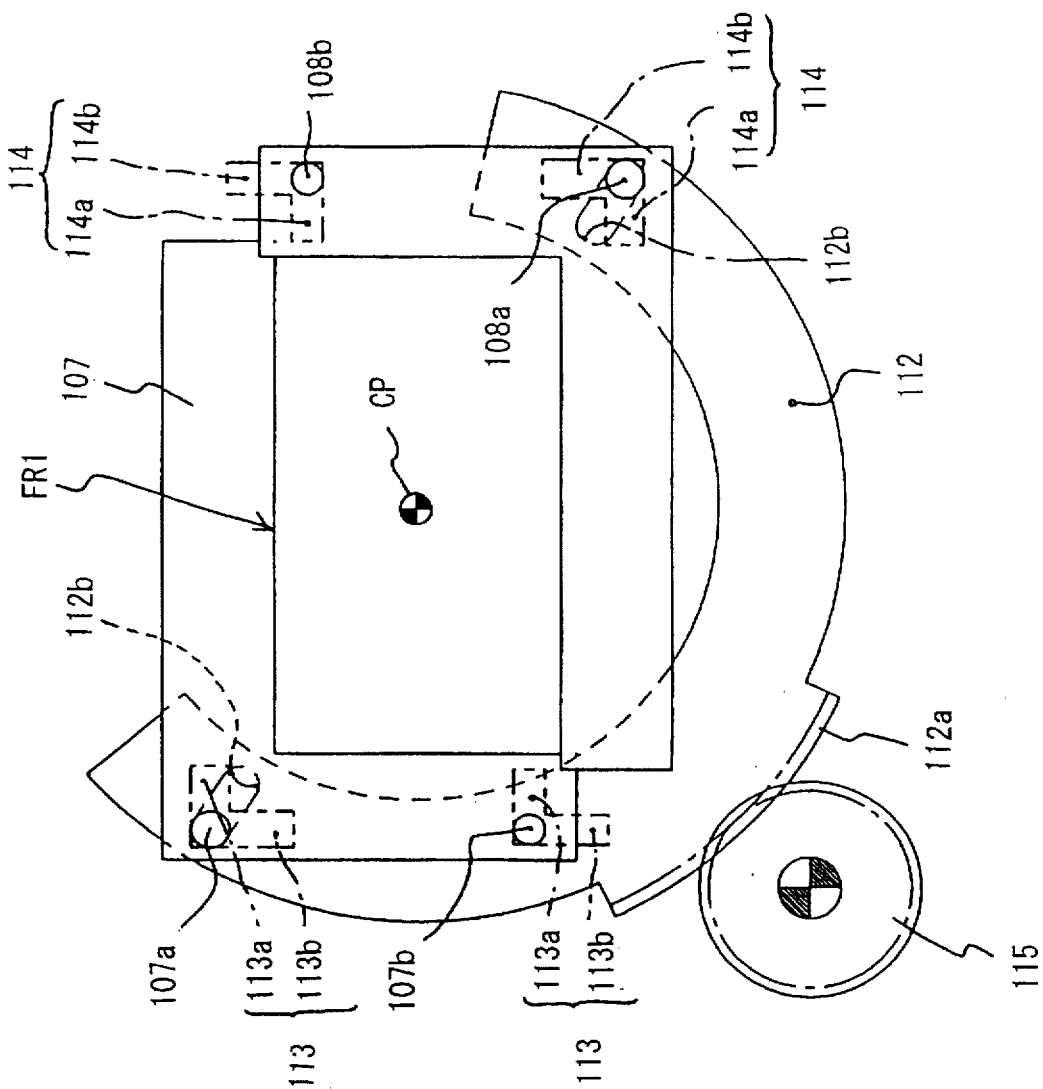
FIG. 7 is a figure showing the state in which a first picture frame is determined in the second embodiment.

First guide slots 113 through which the two cam pins 107a and 107b of the picture frame determination member 107 pass and second guide slots 114 through which the two cam pins 108a and 108b of the picture frame determination member 108 pass are formed in the cam guide plate 111 and serve for guiding the picture frame determination members 107 and 108. As shown in FIG. 7, the first guide slots 113 and the second guide slots 114 respectively have first straight line portions 113a and 114a parallel to the long sides of the picture frame FR defined upon the inside of the picture frame determination members 107 and 108, and second straight line portions 113b and 114b parallel to the short sides of the picture frames FR. As shown in FIG. 6, a rectangular opening 111a is formed in the center of the cam guide plate 111. The size of this opening 111a is set to be greater than that of the first picture frame FR1 which is to be defined by the picture frame determination members 107 and 108.

The cam drive plate 112 is supported by a support member not shown in the figures so as to be rotatable about the center CP of the picture frame FR (which agrees with the optical axis AX of FIG. 6). Upon the cam drive plate 112 there are formed a gear portion 112a which is meshed with a cam drive gear 115, and a pair of cam slots 112b through which cam pins 107c and 108c of the picture frame determination members 107 and 108 are passed. The cam slots 112b are provided straight roughly along the diagonal direction of the picture frame FR. The cam drive gear 115 is rotationally driven by a picture frame switchover lever 116 (FIG. 6). The picture frame switchover lever 116 may also be used as a selection lever for the above described format signal.

Figure 8:
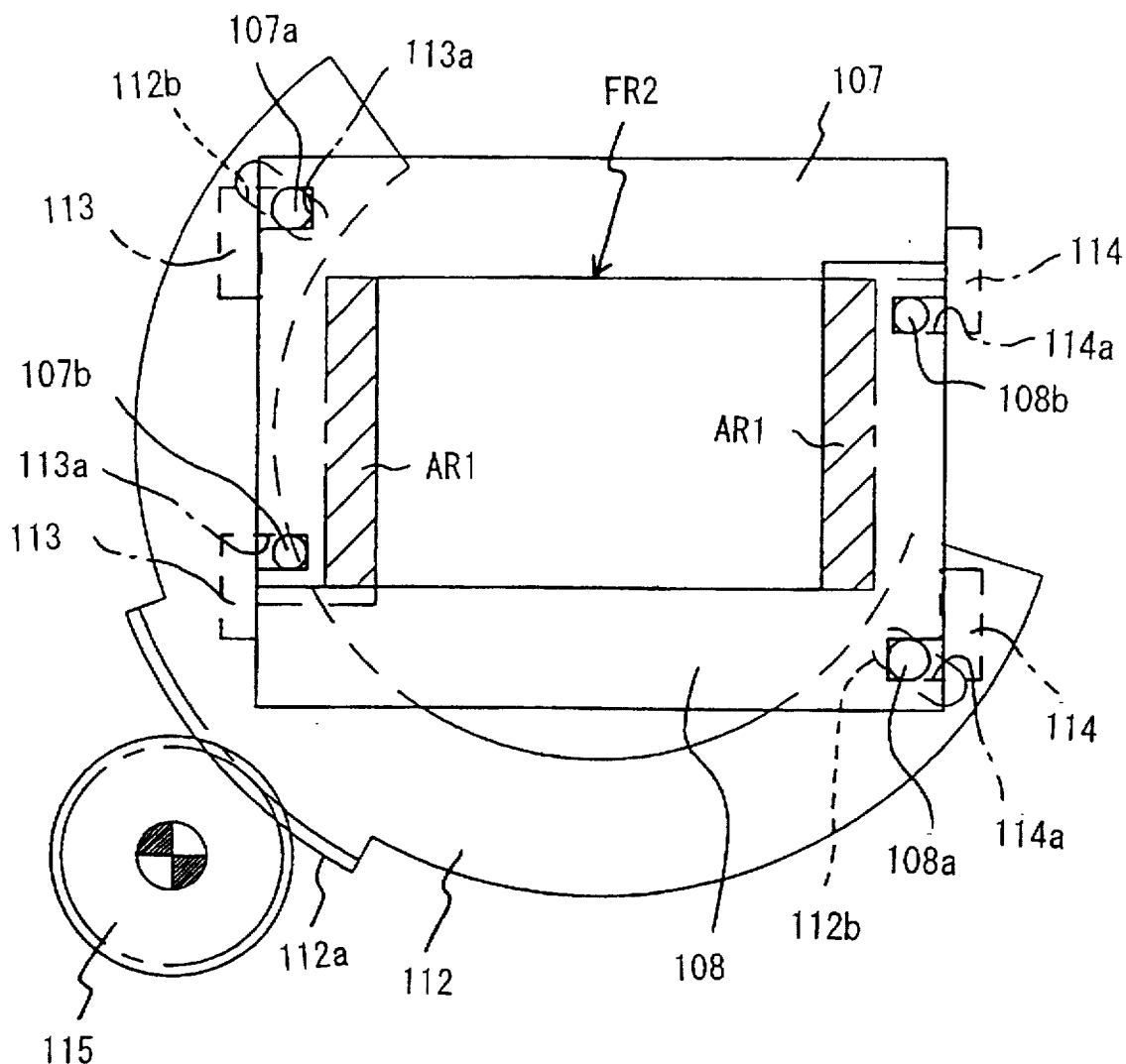
FIG. 8 is a figure showing the state in which a second picture frame is determined in the second embodiment.

In the above described construction, when the picture frame switchover lever 116 is kept at the center of its range of movement, as shown in FIG. 7 the cam pins 107a and 107b of the picture frame determination member 107 are held at the boundary between the first straight line portions 113a and the second straight line portions 113b of the first guide slots 113, while the cam pins 108a and 108b of the picture frame determination member 108 are held at the boundary between the first straight line portions 114a and the second straight line portions 114b of the second guide slots 114, and the first picture frame FR1 is defined. When from the FIG. 7 position the picture frame switchover lever 116 is operated so as to rotate the cam drive gear 115 in the anticlockwise rotational direction, then the cam drive plate 112 is rotated in the clockwise rotational direction around the center CP of the picture frame FR, and as shown in FIG. 8 the cam pins 107a and 107b of the picture frame determination member 107 are shifted into the first straight line portions 113a of the first guide slots 113, while the cam pins 108a and 108b of the picture frame determination member 108 are shifted into the first straight line portions 114a of the second guide slots 114, and the second picture frame FR2 is defined. Moreover, the hatched regions AR1 in FIG. 8 show the difference between the first picture frame FR1 and the second picture frame FR2, in other words show the regions which are not printed when the second format is selected.

Figure 9:
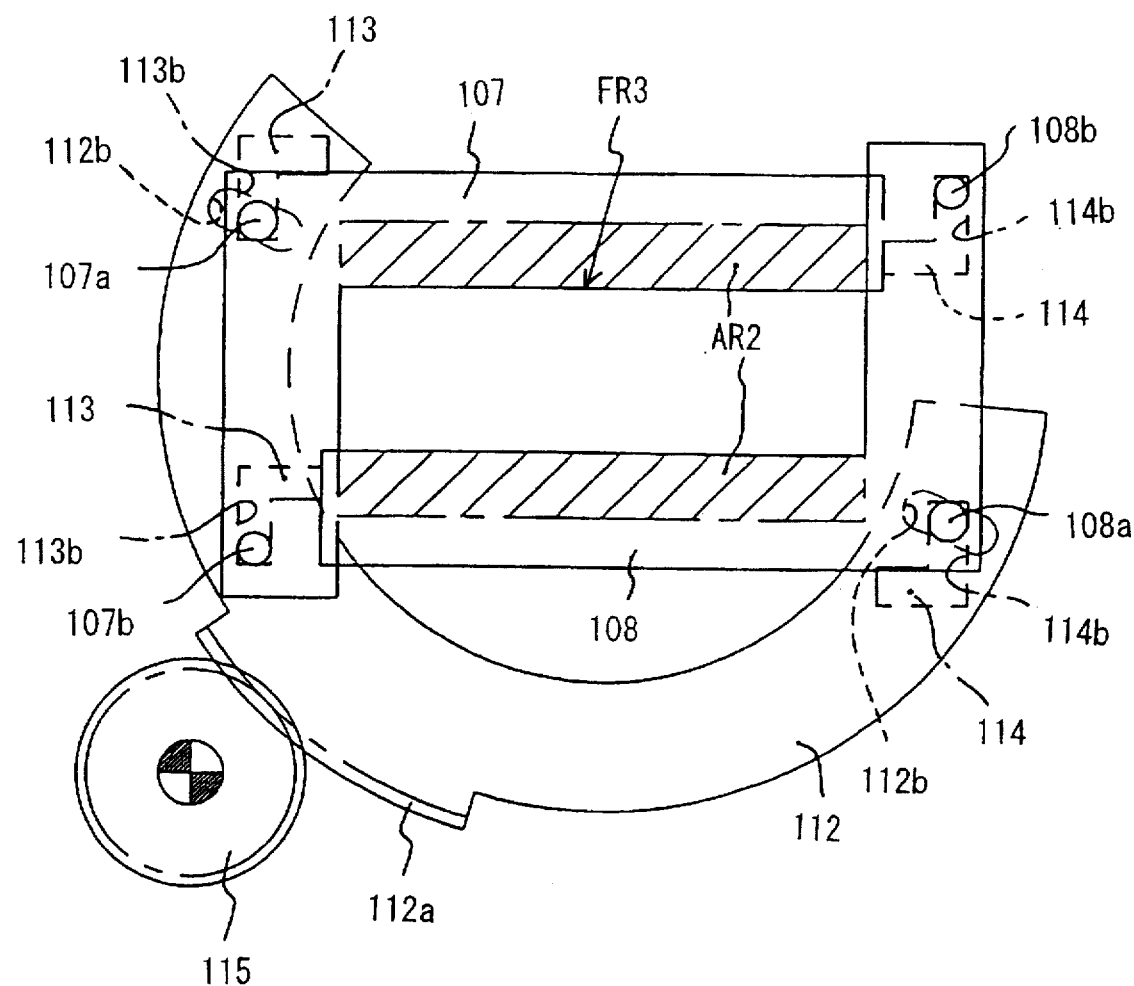
FIG. 9 is a figure showing the state in which a third picture frame is determined in the second embodiment.

On the other hand, when from the FIG. 7 position the picture frame switchover lever 116 is operated so as to rotate the cam drive gear 115 in the clockwise rotational direction, then the cam drive plate 112 is rotated in the anticlockwise rotational direction around the center CP of the picture frame FR, and as shown in FIG. 9 the cam pins 107a and 107b of the picture frame determination member 107 are shifted into the second straight line portions 113b of the first guide slots 113, while the cam pins 108a and 108b of the picture frame determination member 108 are shifted into the second straight line portions 114b of the second guide slots 114, and the third picture frame FR3 is defined. Moreover, the hatched regions AR2 in FIG. 9 show the difference between the first picture frame FR1 and the third picture frame FR3, in other words show the regions which are not printed when the third format is selected.

As explained above, with this second embodiment, since it is possible to shift the picture frame determination members 107 and 108 respectively and individually in the direction parallel to one side of the picture frame and in the direction parallel to the other side thereof, thereby it is possible to vary the picture frame in any of the upwards, downwards, leftwards, and rightwards directions by any desired amount, even without reserving large spaces upwards, downwards, leftwards, or rightwards of the picture frame, and it is possible to propose a picture frame switching mechanism which is simple and also compact for an optical device like a camera in which the internal space is limited. Further, it is possible to vary the combination of the pair of picture frame determination members 107 and 108 so as to obtain a great variety of picture frames, and it is not necessary to provide any great variety of picture frame definition members.

With the above described second embodiment, by forming the cam guide plate 111 from opaque material, if the size of its opening 111a agrees with the first picture frame FR1, thereby the surround of the first picture frame FR1 in the field of view of the eyepiece lens 5 is always pitch black, and since the brightness of the hatched area AR1 or AR2 in FIG. 8 or FIG. 9, when the second picture frame FR2 or the third picture frame FR3 is selected, is reduced in correspondence to the transparency ratio of the picture frame determination members 107 and 108, therefore if this transparency ratio is not 0% the two types of picture frame can simultaneously be checked. It is beneficial to arrange for it to be possible to fix the picture frame switchover lever 116 by a notch mechanism or the like in positions respectively corresponding to the first picture frame FR1, the second picture frame FR2, and the third picture frame FR3. With a camera constructed so that it is possible to change the size of an aperture which is directly in front of the exposure plane of the film, whereby it is also possible to vary the size itself of the photographic picture which is recorded upon the film in correspondence with the above described first through third picture frames, it is possible to link together the movements of the picture frame switchover lever 116 and the aperture.

Figure 10A:
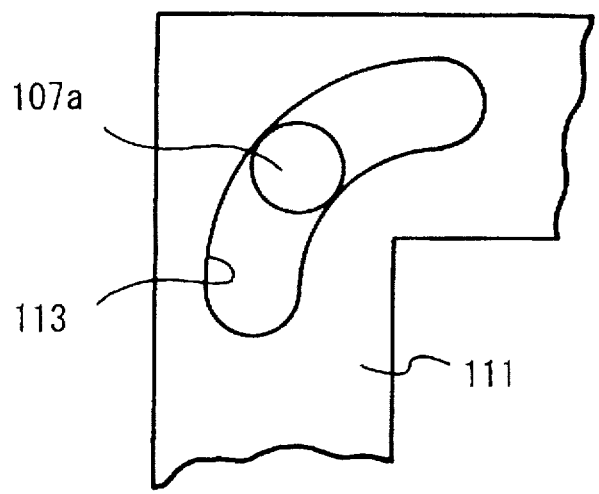
FIG. 10A is a view showing a variant example of a guide slot of the second embodiment.
Figure 10B:
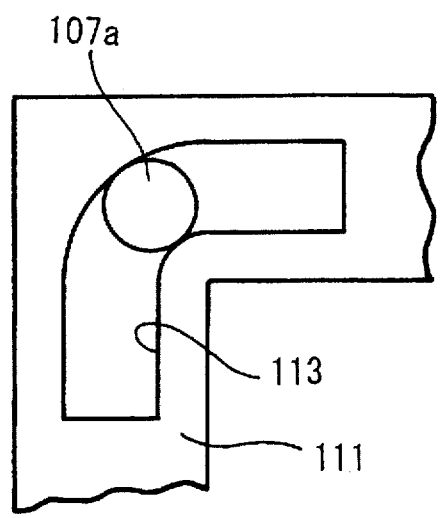
FIG. 10B is a view showing a variant example of a guide slot of the second embodiment.

With the above described second embodiment, the positions of the picture frame determination members 107 and 108 in FIG. 7 correspond to their standard positions. Moreover, it would also be acceptable, as convenient alterations, to construct the first and second guide slots 113 and 114 for example as shown in FIG. 10A in the shape of circular arcs, or as shown in FIG. 10B to form them in the shapes of combined circular arcs and straight lines or the like.

Embodiment 3

Figure 11:
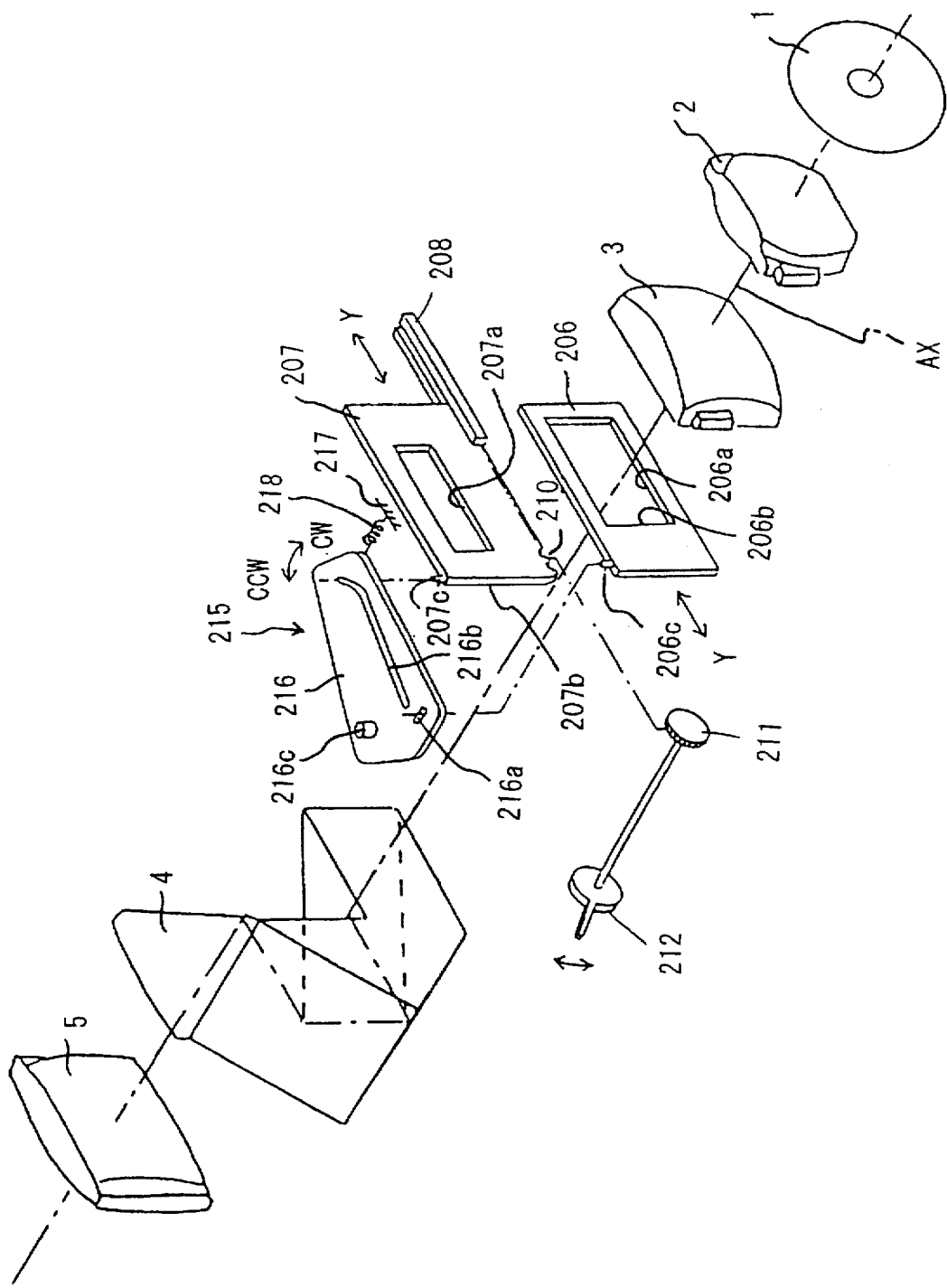
FIG. 11 is a perspective diagram showing an overall structural view of a viewfinder optical system according to the third embodiment of the present invention.
Figure 12A:
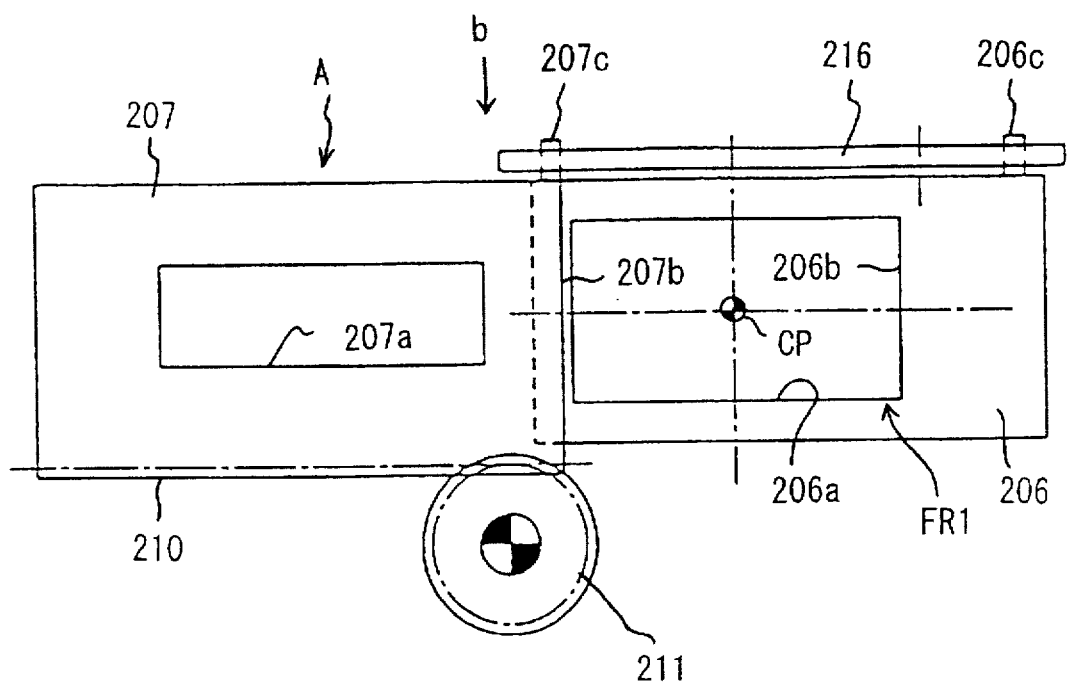
FIG. 12A is a view showing the state in which a first picture frame is determined in the third embodiment, as seen from the side of a prism.
Figure 12B:
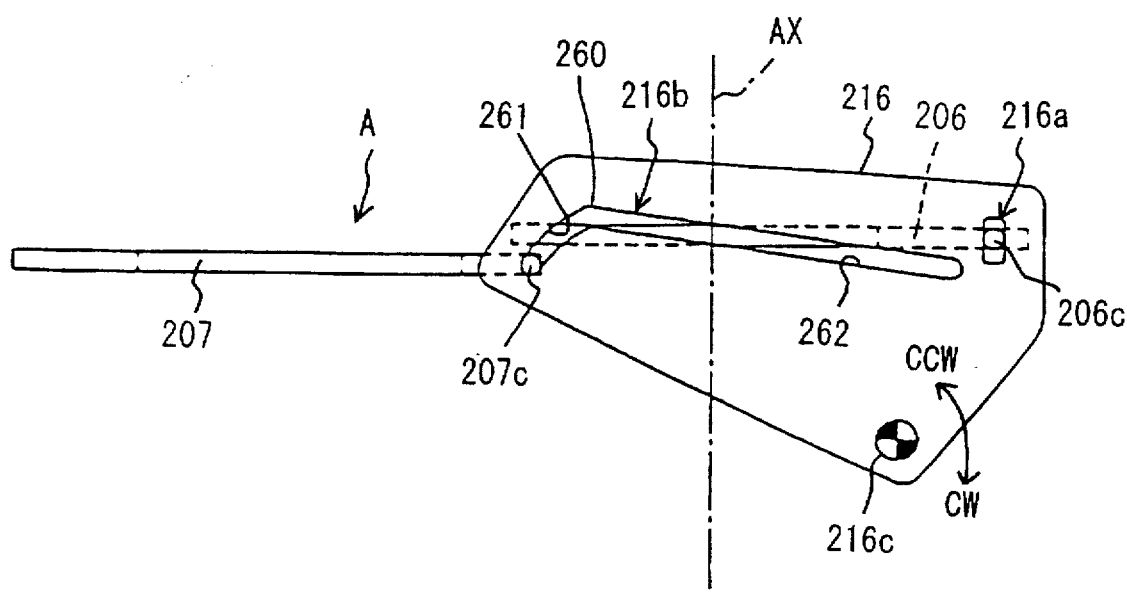
FIG. 12B is a plan view of FIG. 12A as seen from the direction "b"
Figure 13A:
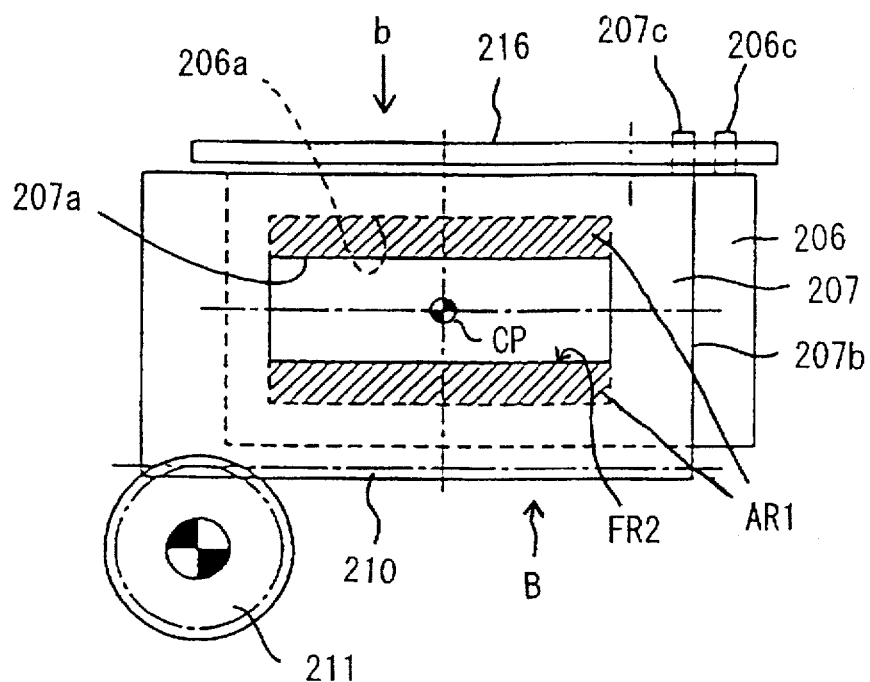
FIG. 13A is a view showing the state in which a second picture frame is determined in the third embodiment, as seen from the side of a prism.
Figure 13B:
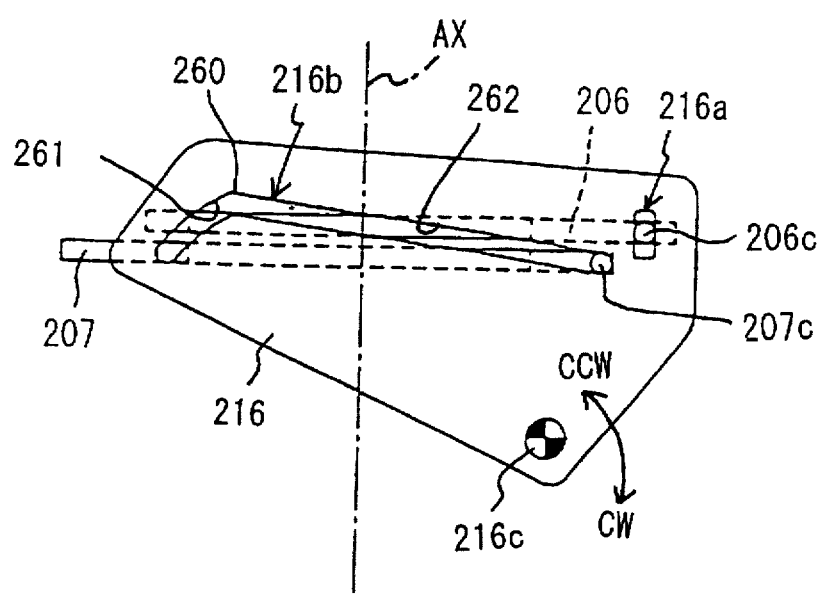
FIG. 13B is a plan view of FIG. 13A as seen from the direction "b"
Figure 14A:
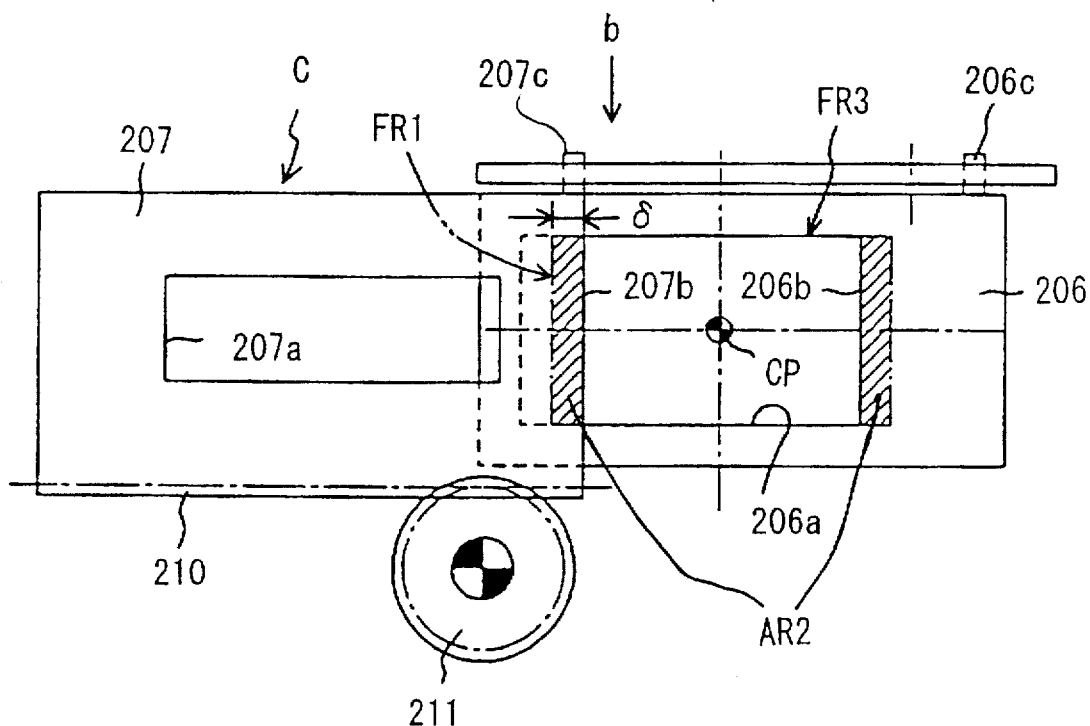
FIG. 14A is a view showing the state in which a third picture frame is determined in the third embodiment, as seen from the side of a prism.
Figure 14B:
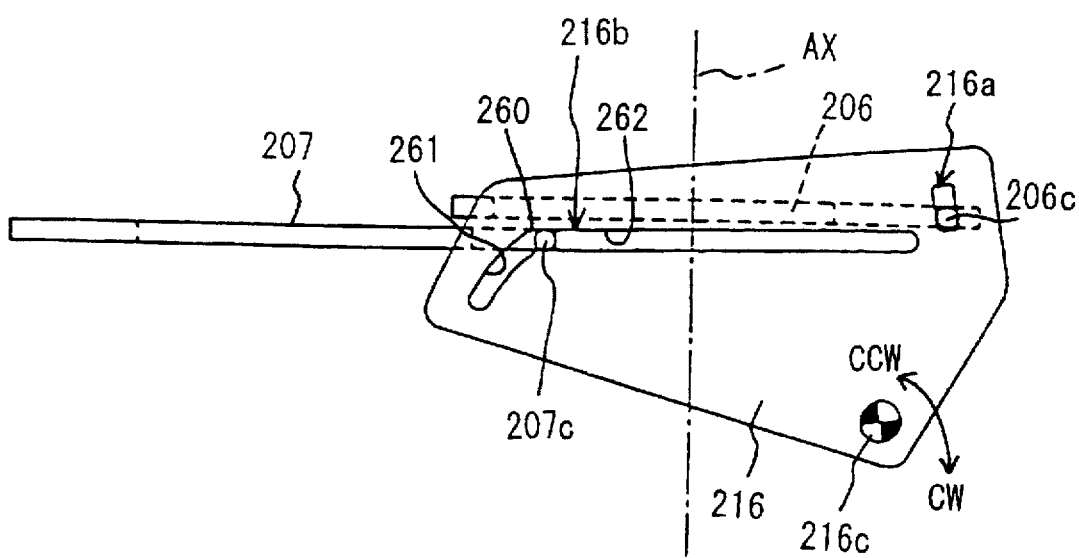
FIG. 14B is a plan view of FIG. 14A as seen from the direction "b"

The third embodiment of the present invention will now be explained with reference to FIG. 11 through FIG. 15. FIG. 11 is a perspective diagram showing the overall structure of a real image type viewfinder optical system of a camera of the third embodiment to which the present invention is applied. To parts which are the same as FIG. 1 of the first preferred embodiment the same reference symbols are affixed, and their description will be curtailed. FIGS. 12A, 13A, and 14A show the state of picture frame determination members 206 and 207 as seen from the side of a prism 4, while FIGS. 12B, 13B, and 14B are plan views of FIGS. 12A, 13A, and 14A as seen from the direction of the arrows "b".

In this third embodiment, a first picture frame determination member 206 and behind it a second picture frame determination member 207 are respectively provided in the focal plane (the real image plane) of the objective lens 3. By the second picture frame determination member 207 shifting in the directions following the long sides of the picture frame (the directions of the arrows Y in FIG. 11) while being guided by a guide member 208 and by the first picture frame determination member 206 executing to and fro operation in the direction following the long sides of the picture frame in accompaniment with the shifting operation, three types of picture frame are determined within the optical path of the viewfinder: a first picture frame FR1 (FIG. 12A) which corresponds to the first format, a second picture frame FR2 (FIG. 13A) which corresponds to the second format, and a third picture frame FR3 (FIG. 14A) which corresponds to the third format.

As shown in FIG. 12A, when the second picture frame determination member 207 is withdrawn to the side of the first picture frame determination member 206 to the withdrawn position A, the first picture frame FR1 is defined within the viewfinder optical path by the opening 206a of the first picture frame determination member 206. When as shown in FIG. 13A the second picture frame determination member 207 is displaced along the rear (the prism 4 side) of the first picture frame determination member 206 as far as the superimposed encroaching position B, the second picture frame FR2 is defined by the opening 207a of the second picture frame determination member 207. When as shown in FIG. 14A the second picture frame determination member 207 has been displaced to a central stopping position C which is between the withdrawn position A and the encroaching position B so that its short side portion 207b encroaches towards the picture center CP from the short side of the first picture frame FR1 by just a specified amount 6, then the first picture frame determination member 206 is displaced towards the side of the second picture frame determination member 207 just by the above described predetermined amount δ from its position when defining the first picture frame FR1, and a third picture frame FR3 is defined by the short side portions 206b and 207b of these two members 206 and 207 (refer to FIG. 11 ) which is narrowed down from the first picture frame FR1 in the direction along its long sides.

The picture centers CP of all of the picture frames FR1 through FR3 lie upon the viewfinder optical axis AX. The picture frame determination members 206 and 207 are made from a light reducing material (for example ND filter with a transparency ratio of about 10%). However, it is also acceptable to make them from an opaque material. The hatched regions AR1 in FIG. 13A are regions showing the difference between the first picture frame FR1 and the second picture frame FR2, that is to say the non printed regions when the second format is selected, while the hatched regions AR2 in FIG. 14A are regions showing the difference between the first picture frame FR1 and the third picture frame FR3, that is to say the non printed regions when the third format is selected.

Although various constructions can be conceived of as mechanisms for realization of the movement of the above described picture frame determination members 206 and 207, in this third embodiment this mechanism is constructed in the following manner. Now, since in the following it is not particularly necessary to distinguish between the picture frames FR1 through FR3, reference will simply be made to "the picture frame FR".

A rack 210 is integrally formed on the lower side of the second picture frame determination member 207 in order to drive the second picture frame determination member 207 to and fro along the guide member 208, and this rack 210 is meshed with a pinion gear 211, with this pinion gear 211 being coaxially linked to a picture frame switchover lever 212 (FIG. 11). When the picture frame switchover lever 212 is rotated, according to its position, the second picture frame determination member 207 is shifted to its above described withdrawn position A, encroaching position B, or central stopping position C. Moreover, it would be beneficial to arrange for it to be possible to fix the picture frame switchover lever 212 by a notch mechanism or the like in positions respectively corresponding to the above described three positions. The picture frame switchover lever 212 may also be used as a selection lever for the above described format signal. Moreover, with a camera constructed so that it is possible to change the size of an aperture which is directly in front of the exposure plane of the film, whereby it is also possible to vary the size itself of the photographic picture which is recorded upon the film in correspondence with the above described first through third picture frames, it is possible to link together the movements of the picture frame switchover lever 212 and the aperture.

Further, a cam mechanism 215 is provided in order to link the first picture frame determination member 206 with the second picture frame determination member 207 and so as to drive it to and fro in the direction along the long sides of the picture frame FR. This cam mechanism 215 is constructed from cam pins 206c and 207c which are respectively provided on the upper sides of the first and the second picture frame determination members 206 and 207, a cam plate 216 which comprises two cam slots 216a and 216b into which these cam pins 206c and 207c penetrate, and a tension spring 218 which is disposed between the cam plate 216 and a fixed member 217 (for example the body of the camera). The cam plate 216 is rotatable about a support pivot shaft 216c which is parallel to the short sides of the picture frame FR, and is rotationally biased in the clockwise rotational direction CW in FIG. 11 by the tension force of the tension spring 218.

The cam slots 216a and 216b of the cam plate 216 are set so that the first picture frame determination member 206 is shifted in the direction opposite to that of the second picture frame determination member 207 when the second picture frame determination member 207 shifts between the withdrawn position A and the central stopping position C described above, while the first picture frame determination member 206 is shifted in the same direction as the second picture frame determination member 207 when the second picture frame determination member 207 shifts between the central stopping position C and the encroaching position B described above. That is to say, when the second picture frame determination member 207 is in its central stopping position C, the cam pin 207c is positioned at the angle point 260 of the cam slot 216b. When the second picture frame determination member 207 is positioned in the direction more towards the withdrawn position A from the central stopping position C, then the cam pin 207c is shifted into a first straight portion 261, and due to this, the farther the second picture frame determination member 207 is from its withdrawn position A, the more is the cam plate 216 rotated in the anticlockwise rotational direction CCW about the support pivot shaft 216c, so that the cam pin 206c engaged with the cam slot 216a and the first picture frame determination member 206 integrally formed with this cam pin 206c are shifted in the opposite direction from the second picture frame determination member 207. But, when the second picture frame determination member 207 is positioned in the direction more towards the encroaching position B from the central stopping position C, then the cam pin 207c is shifted into a second straight portion 262, and due to this, the closer the second picture frame determination member 207 is to its encroaching position B, the more is the cam plate 216 rotated in the clockwise rotational direction CW about the support pivot shaft 216c, so that the first picture frame determination member 206 is shifted in the same direction as the second picture frame determination member 207.

Figure 15:
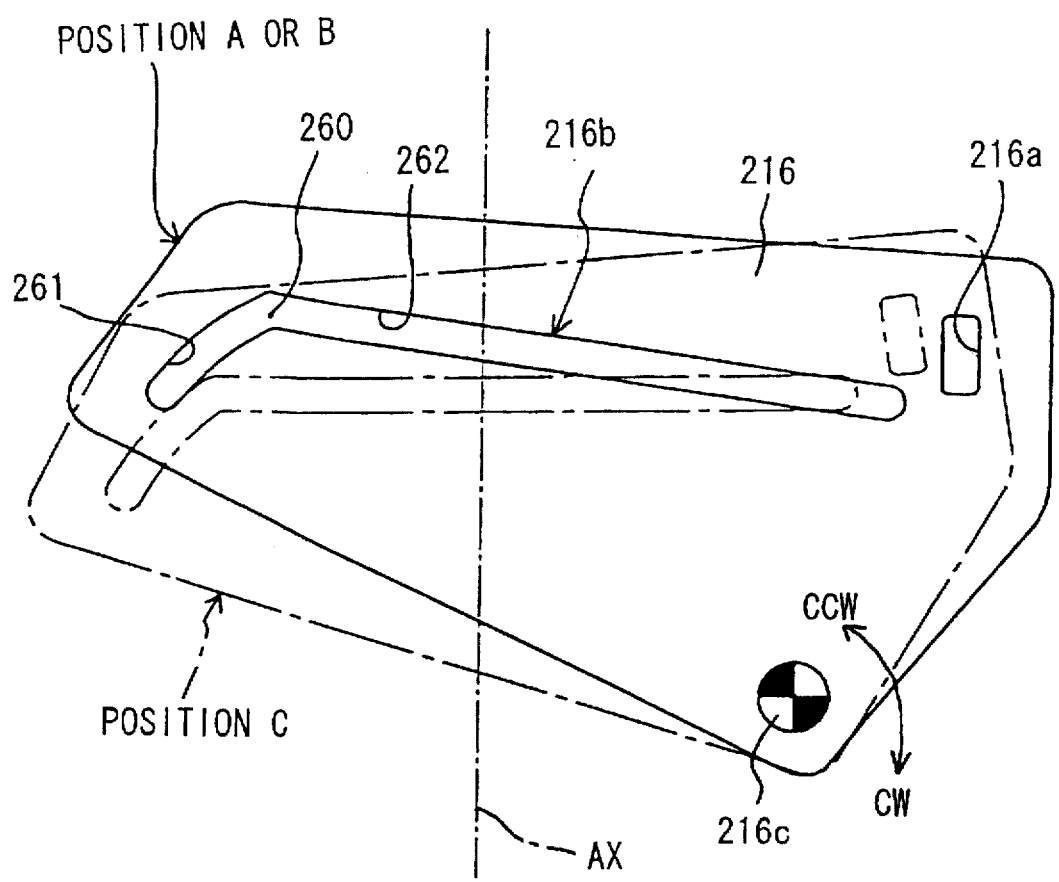
FIG. 15 is a view showing the positional correspondence between a second picture frame determination member and a cam plate, in the third embodiment.

In FIG. 15 there is shown the positional correspondence between the second picture frame determination member 207 and the cam plate 216. As will be clear from this figure, when the second picture frame determination member 207 is shifted from either of its withdrawn position A and its encroaching position B to the other one thereof, the cam plate 216 and the first picture frame determination member 206 make a round trip changing their directions at the central stopping position C.

Since as explained above it is possible to define three types of picture frame just by causing the second picture frame determination member 207 of this embodiment to execute a round trip in the direction following the long sides of the picture frame FR, it is not necessary to arrange for any possibility for displacing any members, which define the third picture frame FR3, in the up and down direction of the picture frame FR, and it is not necessary to guarantee any space for movement of such members in the directions following along the short sides of the picture frame FR. Accordingly, in the case of application to a camera in which the viewfinder optical system and the photographic lens are superimposed in the direction following along the short sides of the picture frame FR, it is not necessary to provide any space for movement of the picture frame between the viewfinder optical system and the photographic lens, and it is possible to compress the interval between the viewfinder optical system and the photographic lens and to reduce the parallax. Moreover, although in this third embodiment the entire first picture frame determination member 206 was moved, it would also be acceptable, as an alternative, to move to and fro only the short side 206b. It would also be acceptable to define one of the short sides of the first picture frame FR1 by the short side 207b of the second picture frame determination member 207. In the case that the direction of movement of the picture frame FR is taken as following along its short sides, it is possible to reduce the space required in the direction of movement, as compared to the case in which the picture frame is moved in the direction following along its long sides.

Furthermore, it would also be acceptable to utilize a link mechanism as the mechanism for moving the two first picture frame determination members together, for example, instead of the cam mechanism.

The explanation relating to the above described embodiment was in terms of a picture frame switching mechanism of a camera viewfinder. However, this picture frame switching mechanism can also be used as an switching mechanism for an aperture frame directly in front of the exposure plane of the film.

Embodiment 4

Figure 16:
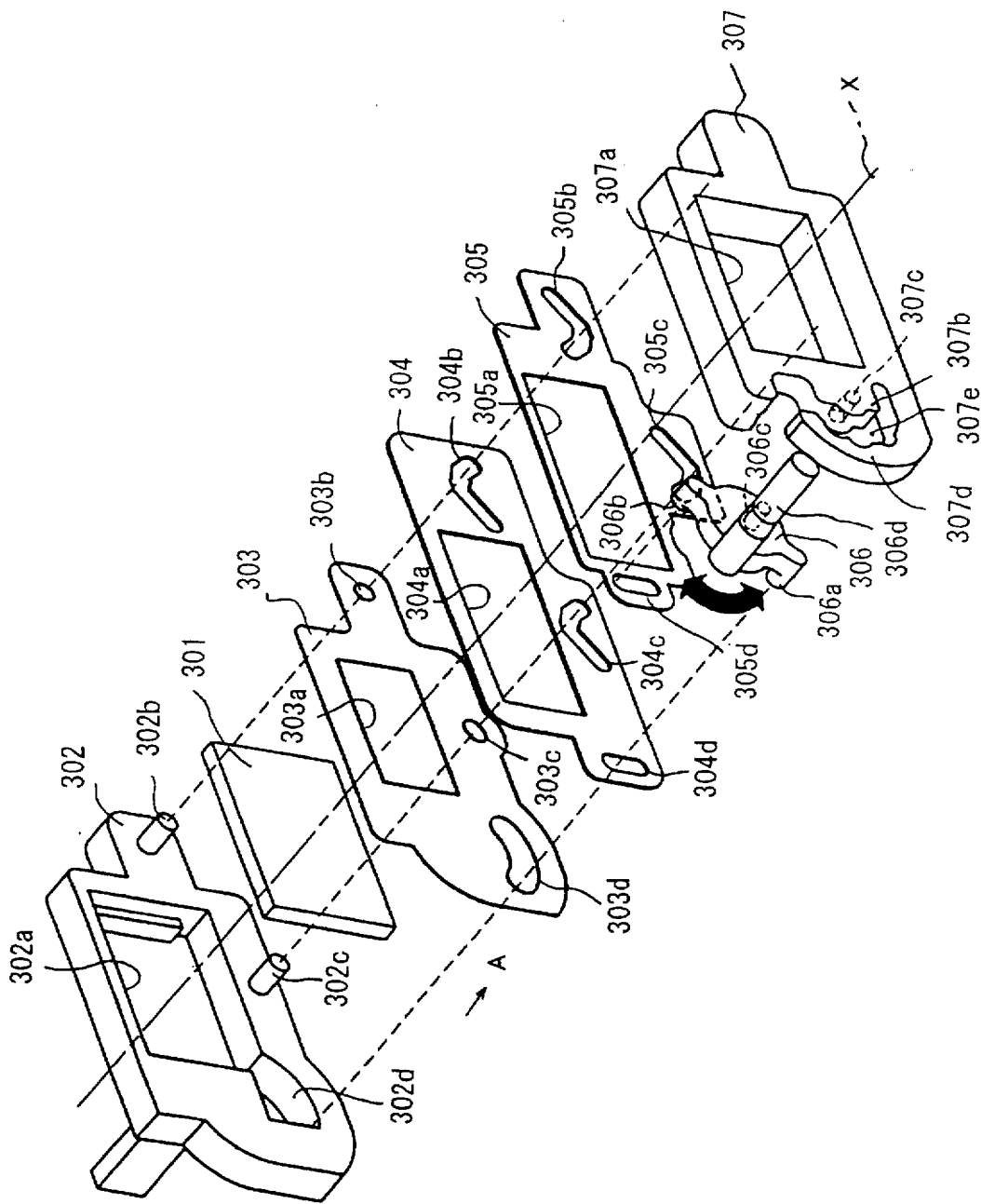
FIG. 16 is an exploded perspective diagram showing a picture frame switching mechanism according to the fourth embodiment of the present invention, with its surroundings.
Figure 17:
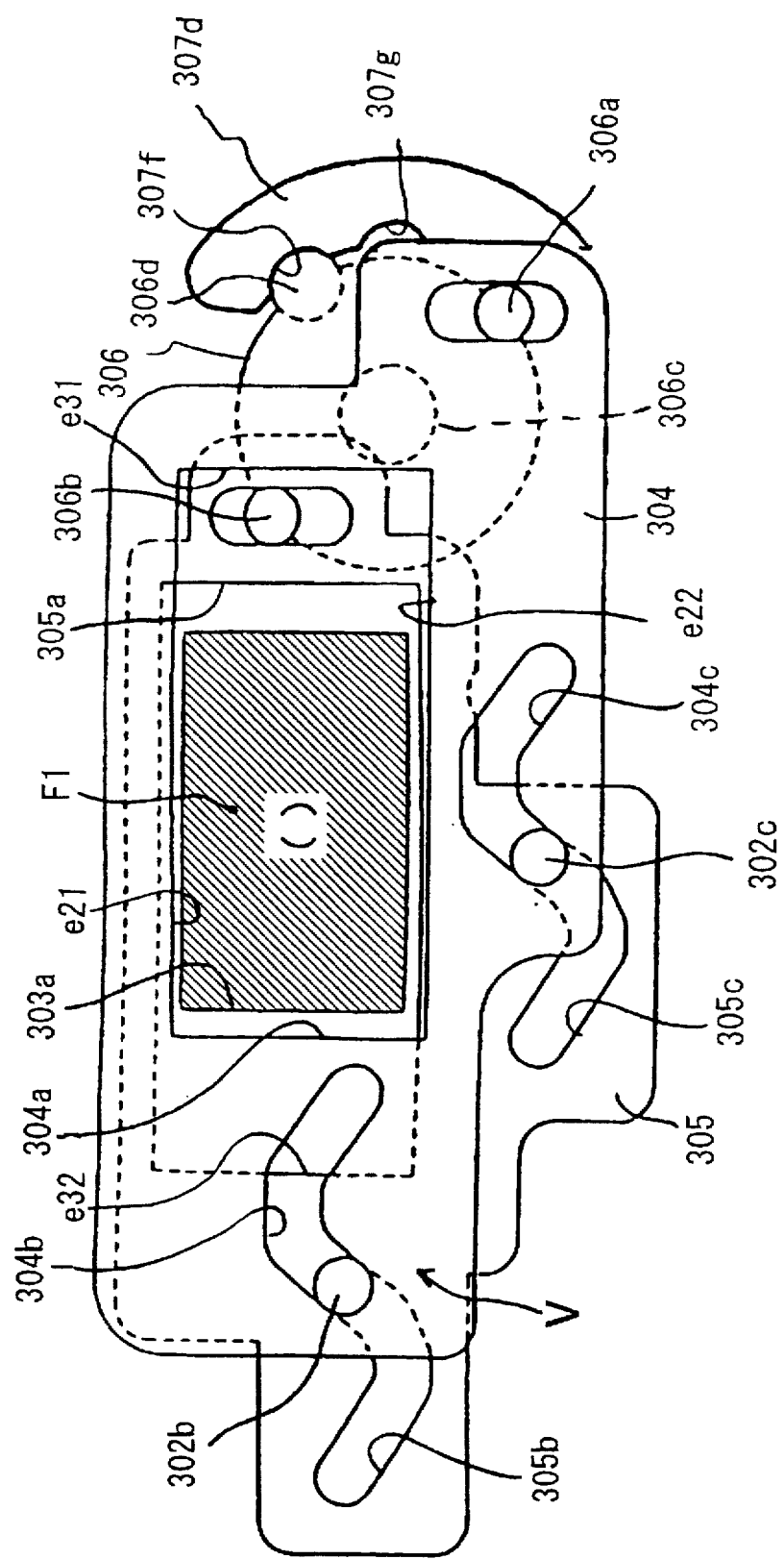
FIG. 17 is a figure showing the state in which a first picture frame is determined in the fourth embodiment.
Figure 18:
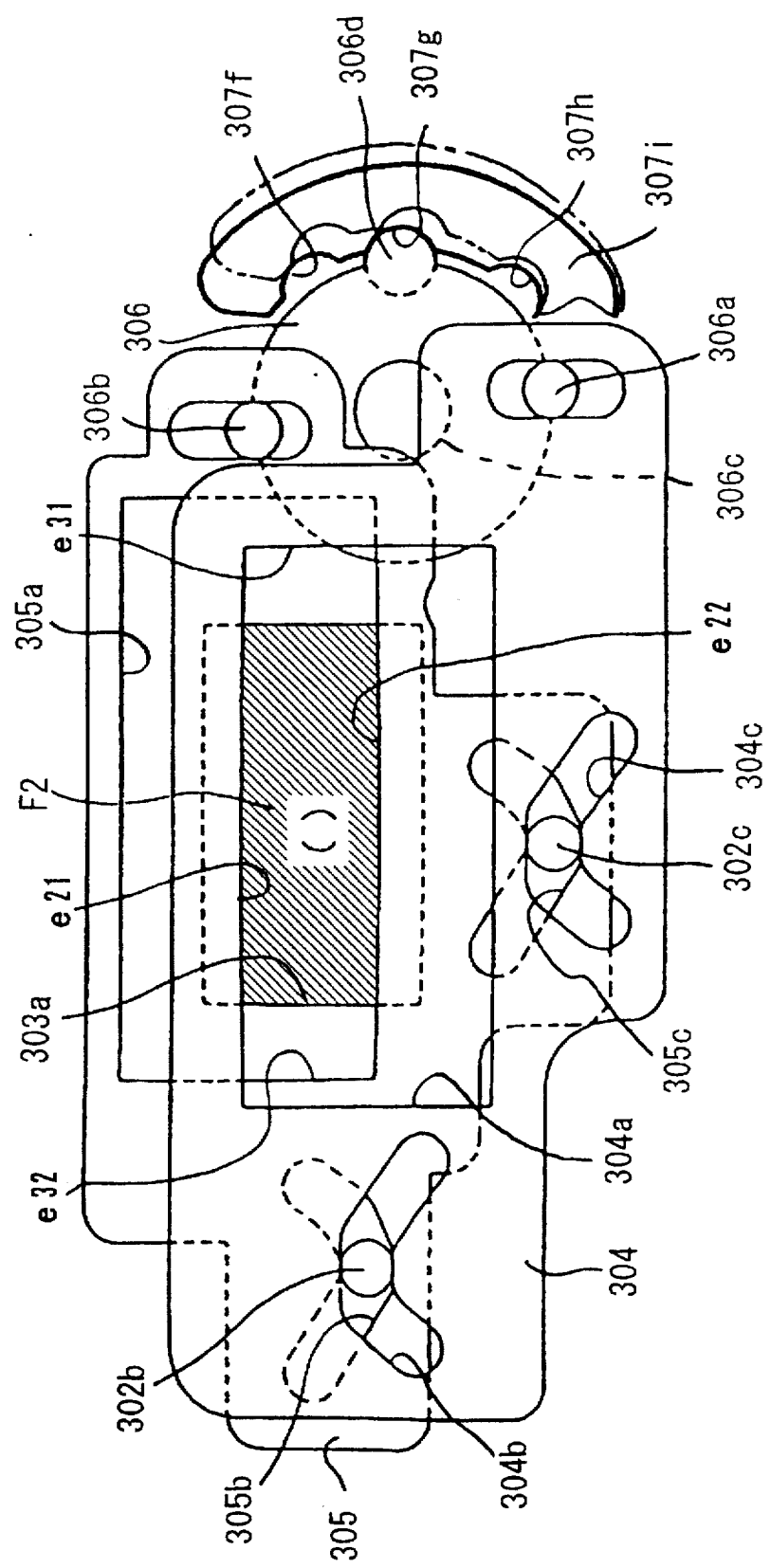
FIG. 18 is a figure showing the state in which a second picture frame is determined in the fourth embodiment.
Figure 19:
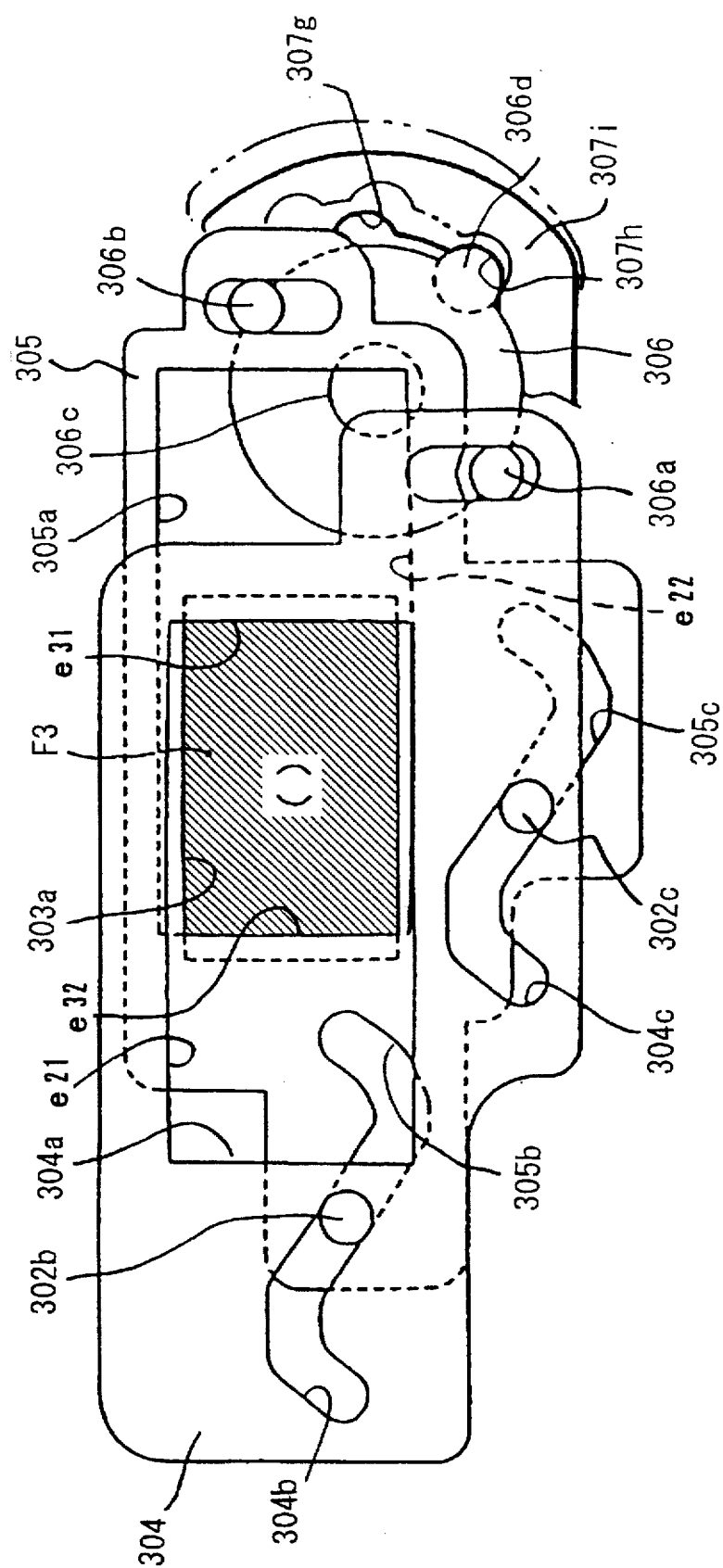
FIG. 19 is a figure showing the state in which a third picture frame is determined in the fourth embodiment.
Figure 20:
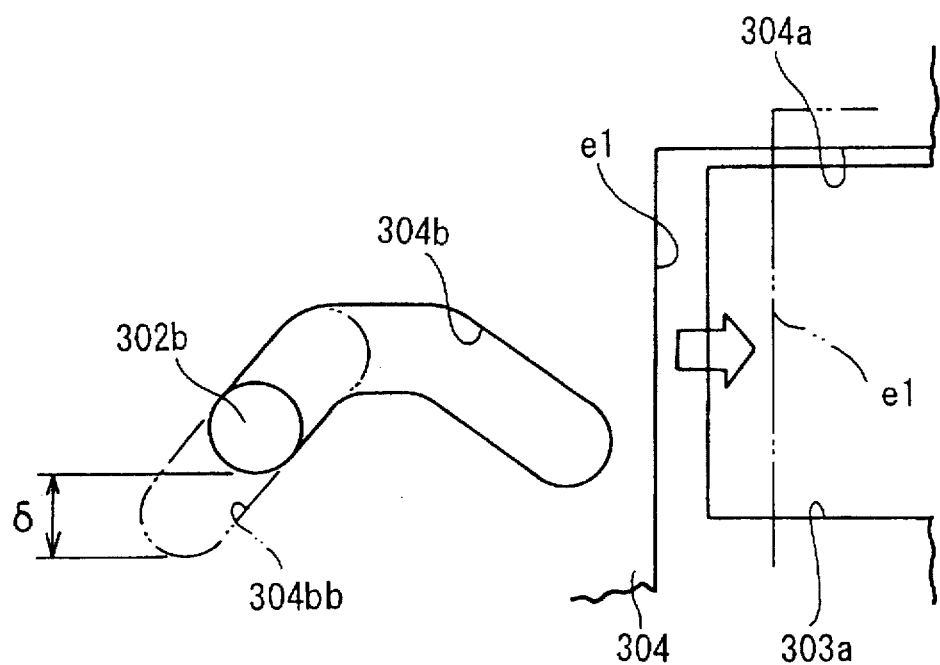
FIG. 20 is a view showing a V portion of FIG. 17 as compared with an example of the prior art.

The fourth embodiment of the present invention will now be explained with reference to FIG. 16 through FIG. 20. FIG. 16 is an exploded perspective diagram showing a picture frame switching mechanism of a real image type viewfinder optical system of a camera of the fourth embodiment to which the present invention is applied, and the vicinity thereof. FIGS. 17 through 19 are figures showing the states in which the picture frames are respectively switched over to, while FIG. 20 is a comparison view with an exemplar prior art. In FIG. 16, 301 is a focus plate upon which an image of an object to be photographed is focused, and 302 is a holder which is equipped with a cutaway hole 302a of rectangular shape into which the focus plate 301 is fitted. A fixed mask 303, a first movable mask 304, and a second movable mask 305 are superimposed upon the holder 302 in that order in the direction of the optical axis X. These masks 303 through 305 are made of an opaque material, and cutaway holes 303a, 304a, and 305a respectively in their central portions are formed there for defining picture frames of rectangular shape within the focus plate 301. The fixed mask 303 is held fixed in one position upon the holder 302 by holes 303b and 303c for determining its position being engaged over pins 302b and 302c of the holder 302. Long holes 304b, 304c, 305b, and 305c which are engaged over the pins 302b and 302c are formed in the movable masks 304 and 305, so that accordingly the movable masks 304 and 305 can be shifted in the lengthwise directions of the long holes 304b, 304c, 305b, and 305c with respect to the fixed mask 303.

A mask drive member 306 is disposed at the side (the left side in FIG. 16) of the masks 303 through 305 which are superimposed upon the holder 302. A pair of shafts 306a and 306b project from this mask drive member 306 in the direction of the optical axis, and the shaft 306a is fitted into a long hole 304d of the first movable mask 304, into a long hole 303d of the fixed mask 303, and into a long hole 302d of the holder 302, while the shaft 306b is fitted into a long hole 305d of the second movable mask 305. A mask pressure plate 307, which is provided with a cutaway hole 397a of almost identical shape and size to the cutaway hole 302a of the holder 302, is superimposed over the front sides of the mask drive member 306 and the second movable mask 305. At this time, a pivot shaft 306c of the mask drive member 306 (refer to FIGS. 17 through 19) is fitted into a fitting hole 307c which is formed in a shaft receiving portion 307b of the mask pressure plate 307, so that the mask drive member 306 is thereby supported so as to be rotatable around this central shaft 306c. The pivot shaft 306c lies outside a first picture frame F1 (FIG. 17) which will be described hereinafter. An operation lever 306d upon the outer periphery of the mask drive member 306 projects to the outside of the mask pressure plate 307 through a slot 307e which is between the shaft receiving portion 307b and an arm 307d. When the mask pressure plate 307 is to be fitted, the pins 302b and 302c which project from the long holes 305b and 305c of the second movable mask 305 are pressed into engagement holes not shown in the figure in the mask pressure plate 307. Accordingly, the focus plate 301, the holder 302, the masks 303 through 305, the mask drive member 306, and the mask pressure plate 307 are assembled so as to constitute a single unit. This assembled unit is fitted into the camera so that the focus plate 301 is in agreement with the focal plane (the real image plane) of the objective lens of the viewfinder.

As shown in FIGS. 17 through 19, three concave portions 307f, 307g, and 307h are formed upon the inner peripheral surface of the arm 307d. When the operation lever 306d is removed from these concave portions 307f through 307h, as shown by double dotted lines in FIG. 18 and FIG. 19 the arm 307d is displaced sideways around its base end portion 307i as an axis; while, when the operation lever 306d is engaged with any one of these concave portions 307f through 307h, the arm 307d returns to its original position (the solid lines) and the mask drive member 306 is constrained. Moreover, FIGS. 17 through 19 show the relationships between the cutaway hole 303a of the fixed mask 303 and the movable masks 304 and 305, the mask drive member 306 and the arm 307d of the mask pressure plate 307 in the state as seen from the direction of the arrow A in FIG. 16.

In the above described mechanism, when the operation lever 306d is displaced along the slot 307e the mask drive member 306 is rotated around the pivot shaft 306c, and the first movable mask 304 which is engaged with the shaft 306a of the mask drive member 306 is shifted in the lengthwise direction along the long holes 304b and 304c, the second movable mask 305 which is engaged with the shaft 306b of the mask drive member 306 is shifted along the lengthwise direction of the long holes 305b and 305c. In accompaniment with this, the positions of the cutaway holes 304a and 305a of the movable masks 304 and 305 which correspond to the cutaway hole 303a of the fixed mask 303 are changed, and, as shown in FIGS. 17 through 19, the viewfinder picture frame is switched between the first picture frame F1, the second picture frame F2, and the third picture frame F3. Now, in FIGS. 17 through 19 the picture frames F1 through F3 are shown as hatched regions. The relationship between the picture frames F1 through F3 and the stopping positions of the mask drive member 306 can be suitably determined according to the shapes of the cutaway holes 304a and 305a, and the long holes 304b, 304c, 305b and 305, and the positions of linkage between the shafts 306a and 306b and the masks 304 and 305, etc., but in particular, in this embodiment, they are set as will now be described.

First, when the operation lever 306d is engaged with the upper concave portion 307f, all of the edges e21, e22, e31, and e32 of the movable masks 304 and 305 which will be described hereinafter are withdrawn outside the cutaway hole 303a of the fixed mask 303, and the first picture frame F1 is determined by the cutaway hole 303a. When from the situation shown in FIG. 17 the operation lever 306d is shifted to the central concave portion 307g, the first movable mask 304 is shifted in the leftwards and slantingly downwards direction following the long holes 304b and 304c, and the second movable mask 305 is shifted in the rightwards and slantingly upwards direction following the long holes 305b and 305c. By doing this, as shown in FIG. 18, the upper side edge e21 of the cutaway hole 304a and the lower side edge e22 of the cutaway hole 305a encroach within the first picture frame F1, so as to determine the second picture frame F2. Next, when from the situation shown in FIG. 18 the operation lever 306d is shifted to the lower concave portion 307h, the first movable mask 304 is shifted in the leftwards and slantingly upwards direction following the long holes 304b and 304c, and the second movable mask 305 is shifted in the rightwards and slantingly downwards direction following the long holes 305b and 305c. By doing this, as shown in FIG. 19, on the one hand the edges e21 and e22 of the cutaway hole 304a and the cutaway hole 305a are withdrawn outside the first picture frame F1, and on the other hand the right side edge e31 of the cutaway hole 304a and the left side edge e32 of the cutaway hole 305a encroach within the first picture frame F1, so as to determine the third picture frame F3.

In this manner, in this embodiment, the long holes 304b, 304c, 305b, and 305c are set so that, when the operation lever 306d of the mask drive member 306 and the concave portion 307f are engaged together, the movable masks 304 and 305 are kept in positions which correspond to the first picture frame F1, and so that, when from this position the mask drive member 306 is shifted in one direction, the movable masks 304 and 305 are shifted in order to positions which correspond to the second picture frame F2 and to the third picture frame F3. Accordingly, the edges e21 and e22 of the movable masks 304 and 305 are not withdrawn from the cutaway hole 303a in the directions following along the short sides of the picture frames F1 through F3 (up and down in the figures) by more than is necessary, and thereby the amounts of movement of the movable masks 304 and 305 in the directions following along the short sides of the picture frames F1 through F3 are made smaller than in the prior art. In this connection, when the V portion of FIG. 17 is compared by way of example with a prior art example, in the prior art, as shown in FIG. 20, since the third picture frame F3 is obtained by the left side edge e1 of the cutaway hole 304a by providing the long hole 304bb which is symmetrical with respect to the position in which the first picture frame F1 is obtained, it is necessary to shift the first movable mask 304 in the upwards direction from the position in which the first picture frame F1 was obtained just by δ in the figure more in excess. Moreover, although δ is brought to zero by providing the long hole 304bb horizontally in a region more to the left from the pin 302b of FIG. 20, since in this case the play of the mask 304 in the direction following along the long sides of the third picture frame F3 cannot be regulated by the engagement portions of the pin 302b and the long hole 304bb, the wobbling of the edge e1 in the third picture frame F3 becomes large. In order to avoid this, it is necessary to slope the long hole 304bb with respect to the direction following along the long sides of the third picture frame F3, and for this reason δ is unavoidably created. In this embodiment, although in the FIG. 18 state the play of the masks 304 and 305 in the direction following along the long sides (the left and right direction) is not regulated, no problem arises, because in this state the masks 304 and 305 are drawn back from the short sides of the second picture frame F2.

Figure 21A:
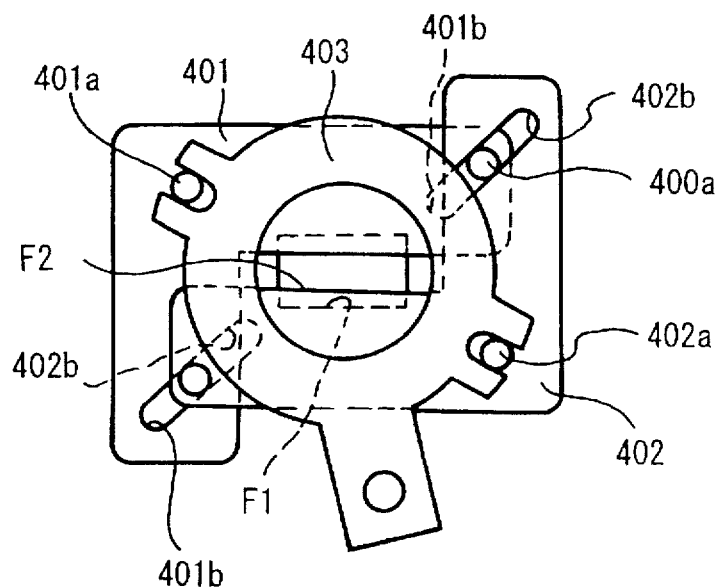
FIG. 21A is a figure showing an example of the prior art.
Figure 21B:
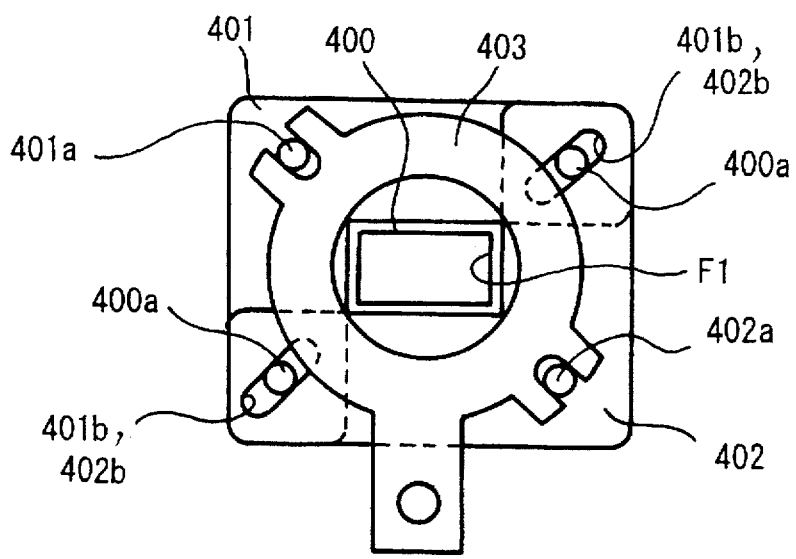
FIG. 21B is a figure showing an example of the prior art.
Figure 21C:
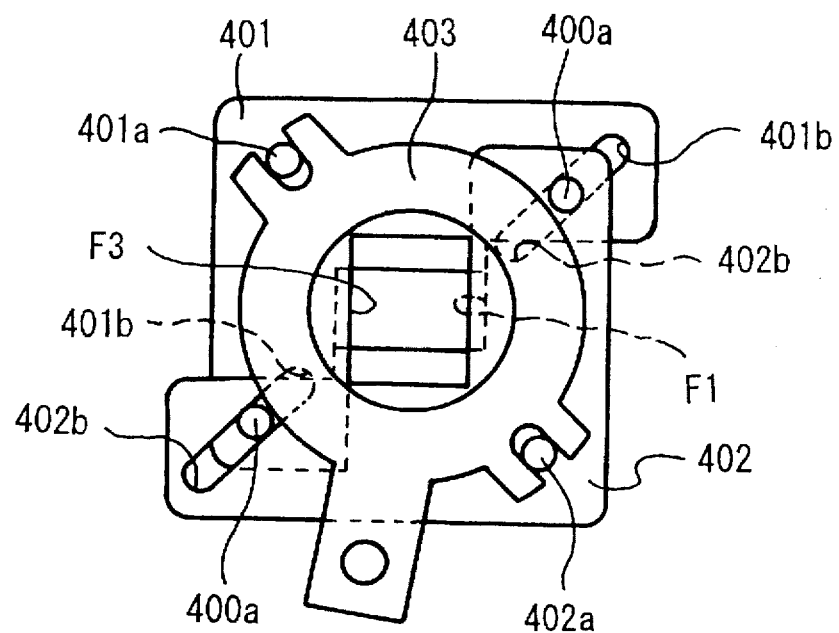
FIG. 21C is a figure showing an example of the prior art.

Further, with the fourth embodiment, since the position of the rotation axis 306c of the mask drive member 306 is set to be outside the first picture frame F1, it is possible to package up the mask drive member 306 and the mechanism which restrains it in its predetermined positions on one side portion of the masks 303 through 305 in a compact manner. In particular, when compared with the prior art shown in FIG. 21, the drive members are removed from the upper sides and the lower sides of the picture frames F1 through F3, and the picture frame switching mechanism is reduced in size in the direction following along the short sides of the picture frames F1 through F3. Further, since the mask drive member 306 is supported at its center of rotation, stability is assured, and the operating feeling of the mask drive member 306 is enhanced. Yet further, picture frames are obtained according to planned values by reliably stopping the movable masks 304 and 305 by the click mechanism at positions which are according to plan. Moreover, since it is possible to arrange the click mechanism in the vicinity of the position of support of the mask drive member 306, along with guaranteeing the accuracy of position determination of the movable masks, it is possible to enhance the feeling of rigidity when operating the mask drive member 306 by restraining the twisting and the bending when rotating the drive member against the binding power of the click mechanism. Furthermore, it is possible to add on a click mechanism just by increasing a little the size of the member which supports the mask drive member 306, and thereby increase of the number of parts and of the number of processes during assembly is checked.

Moreover, although with the fourth embodiment the frame shaped masks 304 and 305 which had the cutaway holes 304a and 305a were used, it would also be acceptable to vary the shape to L-shaped members or the like, provided that they had the above described edges e21, e22, e31, and e32. Further, although in this embodiment the amount of movement of the masks in the direction following along the short sides of the picture frames was restricted, it would also be possible, as an alternative, to arrange the construction so that the amount of movement in the direction following along the long sides was restricted. In this case, it would be acceptable to switch between the first picture frame F1 and the second picture frame F2 via the third picture frame F3.

The explanation relating to the fourth embodiment was in terms of a picture frame switching mechanism of a camera viewfinder. However, this picture frame switching mechanism can also be used as an switching mechanism for an aperture frame directly in front of the exposure plane of the film.

Embodiment 5

Figure 22:
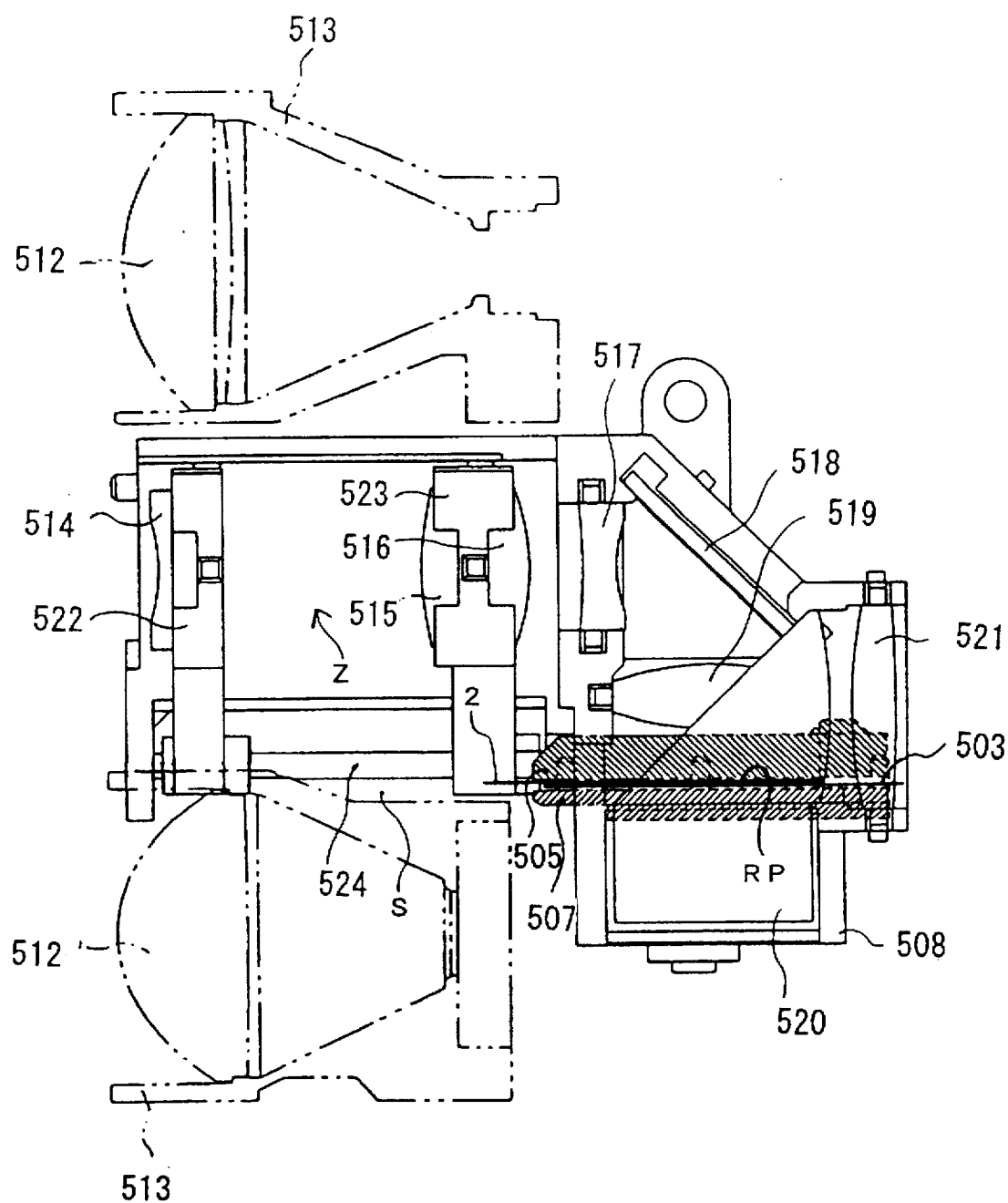
FIG. 22 is a plan view of a viewfinder of a camera according to a fifth embodiment of the present invention, and of its vicinity.
Figure 23:
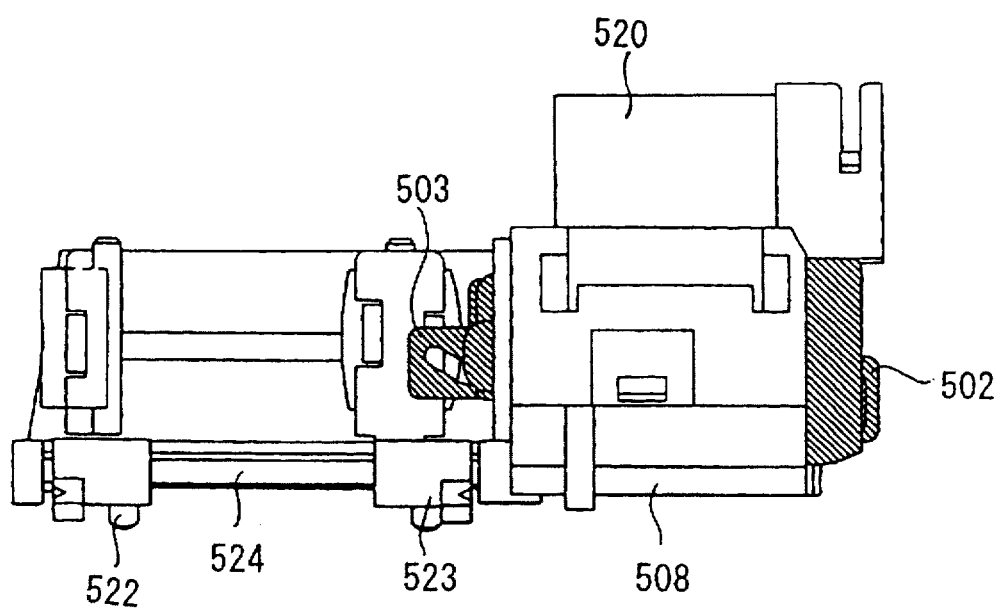
FIG. 23 is an elevation view of the camera according to the fifth embodiment of the present invention, and of its vicinity.
Figure 24:
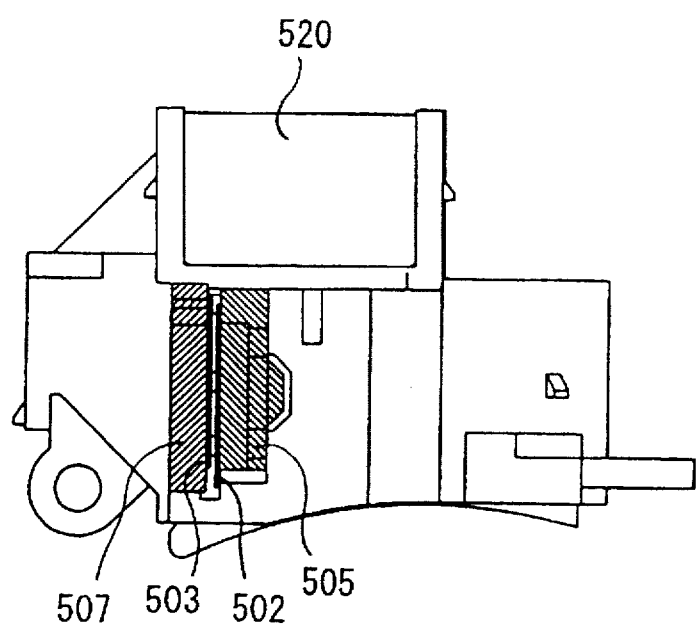
FIG. 24 is a view from the right side of the camera according to the fifth embodiment of the present invention, and of its vicinity.

A fifth embodiment of the present invention will now be explained with reference to FIGS. 22 through 28. FIGS. 22 through 24 are figures showing a viewfinder of a camera according to the fifth embodiment of the present invention and its vicinity. FIG. 22 is a plan view, FIG. 23 is an elevation view, and FIG. 24 is a right side view. The leftward direction in FIGS. 22 and 23 corresponds to the forward direction of the camera (the side towards the object to be photographed), while the upward direction in FIGS. 23 and 24 corresponds to the upward direction on the camera. In FIGS. 22 through 24, 508 is a viewfinder block which can be removed and refitted to the camera body (not shown), and parts (514 through 521) which together constitute a viewfinder optical system are assembled to this viewfinder block 508. 514 through 516 are viewfinder lenses, and the lens 514 is fitted into a lens holder 522 while the lenses 515 and 516 are fitted into a lens holder 523.

The lens holders 522 and 523 are supported by a zoom rod 524 so as to be movable in the fore and aft direction with respect to the camera. This zoom rod 524 is arranged in the right and diagonally downward direction from the viewfinder block 508 as seen from the front surface of the camera, and its central axial direction is parallel to the optical axis of the variable magnification optical system which is constituted by the lenses 514 through 516. When the photographic optical system of the camera (not shown in the figures) is zoomed, in accompaniment therewith the lens holders 522 and 523 are driven in the fore and aft direction with respect to the camera by a lens cam which is not shown in the figures, and the magnification ratio of the viewfinder optical system is altered. A ray bundle which has passed through the lens 516 then passes through the lens 517 and is reflected by the mirror 518, and is then focused by the lens 519 upon a real image plane RP. By this, an image of the object to be photographed is formed upon the real image plane RP. This image of the object to be photographed is inspected by the photographer via a mirror not shown in the figures, a prism 520, and an eyepiece lens 521.

As shown in FIG. 22 by the double dotted chain line, a pair of AF lenses 512 mounted to holders 513 are fitted on both sides of the portion of the viewfinder block 508 in which the variable magnification operation region Z of the variable magnification optical system constituted by the lenses 514 through 516 is provided. These AF lenses 512 are provided for projecting predetermined beams of infrared light towards the object to be photographed in order to measure the distance to it, and for receiving this light which is reflected therefrom. A gap of a certain size is provided between one of the AF holders 513 (the lower one as seen in FIG. 22) and the viewfinder block 508 for serving as an accommodation region S for picture frame switchover masks 502 and 503 which will be described hereinafter. The above described zoom rod 524 is adjacent to the lower side of this accommodation region S. The AF lenses 512 and the holders 513 are omitted in FIGS. 23 and 24.

Figure 25:
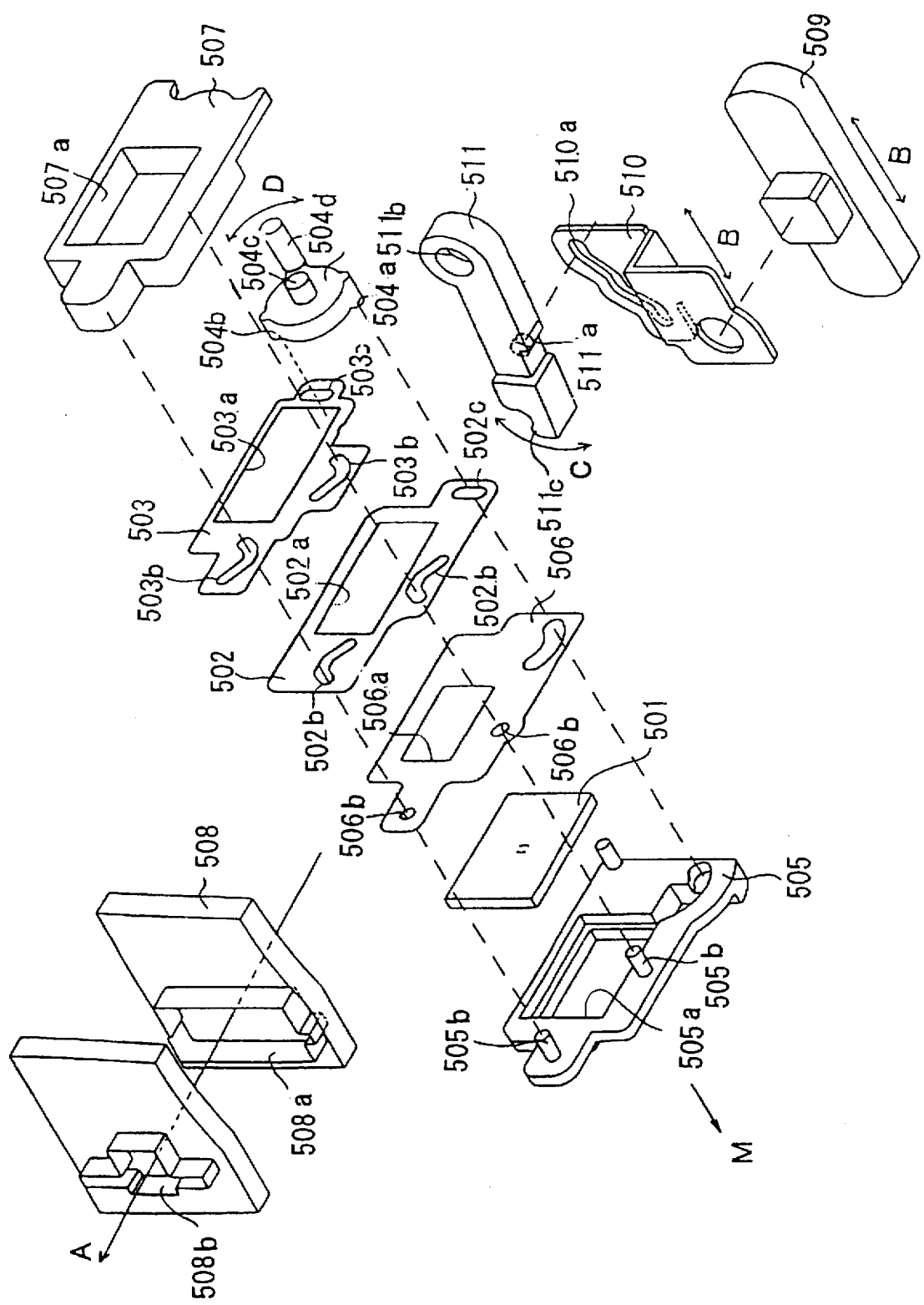
FIG. 25 is an exploded perspective view of a visual field switching mechanism included in the viewfinder of FIGS. 22 through 24 as seen slantingly from below.

A picture frame switching mechanism is provided as positioned in the real image plane RP of the viewfinder block 508. A detailed exploded view of this picture frame switching mechanism as seen slantingly from below is shown in FIG. 25. The direction in FIG. 25 designated by the arrow M corresponds to the direction in FIG. 22 in which the mirror 518 is seen from the real image plane RP. The reference numeral 501 in FIG. 25 denotes a focal plate of the viewfinder optical system which is arranged in the real image plane RP (FIG. 22), while 505 denotes a holder in which the focal plate 501 is held and which is provided with a rectangular cutout hole 505a. A reference picture frame mask 506 which specifies a picture frame for the viewfinder which corresponds to the normal photographic range and a pair of picture frame switchover masks 502 and 503 are superimposed in order onto the holder 505. The masks 502, 503, and 506 are made from light intercepting material, and rectangular cutout holes 502a, 503a, and 506a are formed in their central portions. The reference picture frame mask 506 is held in a fixed position upon the holder 505 by a pair of pins 505b of the holder 505 being engaged with a pair of position determining holes 506b thereof. The picture frame switchover masks 502 and 503 are mounted to the holder 505 by the pins 505b being engaged with respective long holes 502b and 503b thereof.

A mask drive member 504 is arranged at the side of the masks 502, 503, and 506 which are superimposed onto the holder 505. A pair of shafts 504a and 504b are formed upon this mask drive member 504, and the shaft 504a is engaged with the long hole 502c of the picture frame switchover mask 502, while the shaft 504b is engaged with the long hole 503c of the picture frame switchover mask 503. A pressure plate 507 is further superimposed on the outside of the mask drive member 504 and the picture frame switchover mask 503. At this time, the shafts 505b of the holder 505 are pressed inward into fitting holes in the pressure plate 507 which are not shown in the figures. The mask drive member 504 is supported by a central shaft being inserted into a reception hole not shown in the figure of the pressure plate 507 so as to be rotatable about the central shaft 504c thereof. When, for example, the mask drive member 504 is rotated in the clockwise direction as seen in FIG. 25, then the picture frame switchover mask 502 is shifted by the shaft 504a in the direction of the long holes 502b so as to be pushed out, and moreover the picture frame switchover mask 503 is shifted by the shaft 504b in the direction of the long holes 503b so as to be pulled. When the mask drive member 504 is rotated in the anticlockwise rotational direction, then the picture frame switchover masks 502 and 503 are driven in the reverse directions to the above described ones. The picture frame of the viewfinder is switched over by these movements of the masks 502 and 503. The details will be described hereinafter. Moreover, a cutout hole 507a is provided in the pressure plate 507, so that the picture frame of the viewfinder which is defined by the masks 502, 503, and 506 should not be concealed.

The focal plate 501, the masks 502, 503, and 506, the mask drive member 504, the holder 505, and the pressure plate 507 are assembled together in the manner described above to constitute a single built up assembly. This built up assembly is inserted into the interior of the viewfinder block 508 through the hole portion 508a as shown by the arrow A in FIG. 25, and is pressed inward towards the hole portion 508b on the other side thereof. In the state where the built up assembly is fitted to the viewfinder block 508, the position of the focal plate 501 agrees with the real image plane RP of FIG. 22, and the position of the picture frame switchover masks 502 and 503 disposed in its vicinity is determined so as to connect with the accommodation region S of FIG. 22 in the fore and aft direction of the camera.

On the rear surface of the camera (the surface upon which the eyepiece lens 521 of FIGS. 22 through 24 is exposed) there is fitted a switchover knob 509 which can be operated by being slid in the leftwards and rightwards direction of the camera (the direction shown by the arrow B in FIG. 25). Inside the camera, there are provided a cam plate 510 which is slid in the same direction as the switchover knob 509 and a drive arm 511 which is engaged via a cam pin 511a with a cam groove 510a of the cam plate 510. Along with the sliding operation of the cam plate 510, the drive arm 511 is rotated around a rotational support point 511b in the direction of the arrow C, and its end portion 511c contacts the lower surface of a drive shaft 504d of the mask drive member 504. The mask drive member 504 is normally biased in the direction for this drive shaft 504d to contact the drive arm 511 by a biasing means such as a spring or the like which is not shown in the figure. Accordingly, when the switchover knob 509 is operated by being slid, the mask drive member 504 is rotationally driven within a predetermined rotational driving range, either in the clockwise direction or in the anticlockwise direction according to its direction of operation, and the picture frame of the viewfinder is switched over. Moreover, the above described biasing means will not be necessary if the construction is such that the drive shaft 504d is squeezed at the end portion 511c of the drive arm 511 so that the drive shaft 504d is stopped by the end portion 511c whichever way the drive arm 511 is rotated.

Figure 26:
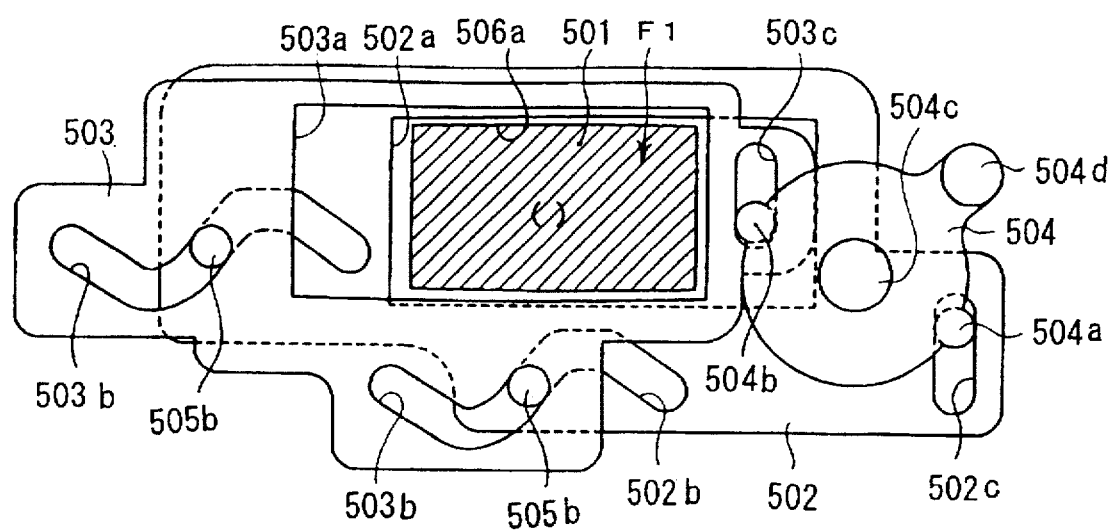
FIG. 26 is a view showing the condition in which a reference first visual field is specified by the visual field switching mechanism of FIG. 25.
Figure 27:
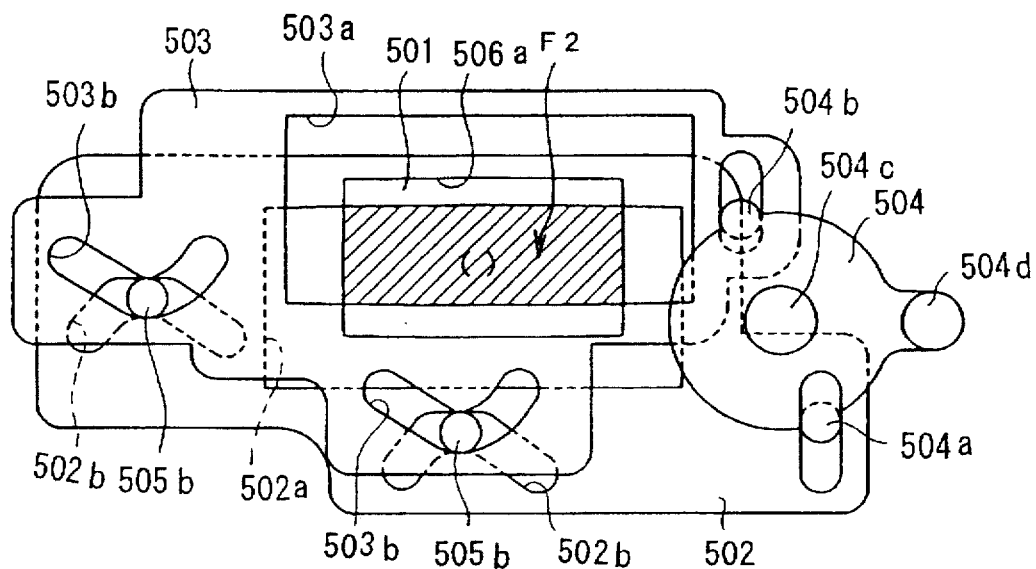
FIG. 27 is a view showing the condition in which a second visual field is specified by covering the long sides of the first visual field of FIG. 26.
Figure 28:
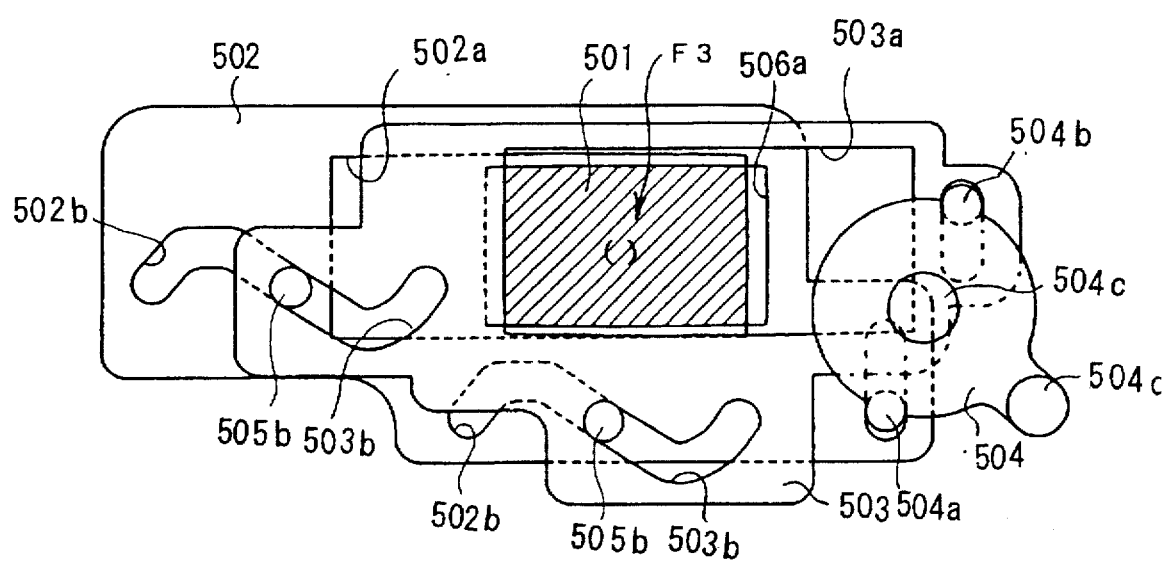
FIG. 28 is a view showing the condition in which a third visual field is specified by covering the short sides of the first visual field of FIG. 26.

FIGS. 26 through 28 show states of the viewfinder picture frame which have been switched over by the above described masks 502, 503, and 506. Moreover, each of FIGS. 26 through 28 shows an unobstructed view of a state of the picture frame switching mechanism of FIG. 25 as seen from its right upper side in the direction of the arrow M in the same figure. Accordingly, the leftward direction in FIGS. 26 through 28 corresponds to the frontward direction of the camera (towards the object to be photographed), while the upward direction in these figures corresponds to the upward direction of the camera. Further, in FIGS. 26 through 28, the picture frames which are displayed within the viewfinder are shown by hatching. FIG. 26 is the state with the mask drive member 504 rotationally driven to the maximum in the anticlockwise direction as seen in FIG. 25 in its rotational drive range. In this state, the picture frame switchover masks 502 and 503 are outside the frame of the cutout hole 506a of the reference picture frame mask 506, and a rectangular shaped first picture frame F1 is defined only by the reference picture frame mask 506. When from the state of FIG. 26 the mask drive member 504 is rotationally driven in the clockwise direction as far as an almost central position within its drive range, the state of FIG. 27 is established. In this state, a second picture frame F2 is defined by the long sides of the first picture frame F1 of FIG. 26 being shaded by a predetermined amount by the picture frame switchover masks 502 and 503. When from the state of FIG. 27 the mask drive member 504 is further rotationally driven in the clockwise direction, the state of FIG. 28 is established. In this state, a third picture frame F3 is defined by the short sides of the first picture frame F1 of FIG. 26 being shaded by a predetermined amount by the picture frame switchover masks 502 and 503. When the picture frame is switched over as described above, the picture frame switchover masks 502 and 503 are selectively projected from the viewfinder block 508 towards the front of the camera, and these projecting portions are accommodated in the accommodation region S. That is, in the state of FIG. 26 the picture frame switchover mask 503 is accommodated in the accommodation region S, and in the state of FIG. 28 the picture frame switchover mask 502 is accommodated in the accommodation region S.

The accommodation region is not limited to the one explained above; for example, it would also be acceptable to arrange elements which constitute a photometric means or a strobe at the side of the viewfinder block, and to provide an accommodation region for the picture frame switchover members in the gap between them. Although in this fifth embodiment any one of three picture frames was selectably defined by two superimposed types of picture frame switchover members, it would also be acceptable for either of two picture frames to be selectably defined by a single picture frame switchover member

Embodiment 6

A sixth embodiment of the present invention will now be explained with reference to FIGS. 29 through 31. The sixth embodiment is an embodiment which resembles the fifth embodiment, but in the sixth embodiment the method of assembling the picture frame switching mechanism will principally be explained. Moreover, although in the fifth embodiment and the sixth embodiment many elements are duplicated, for the convenience of explanation new reference symbols will be affixed to the duplicated elements in the explanation which is made using the new figures (FIGS. 29 through 31).

Figure 29:
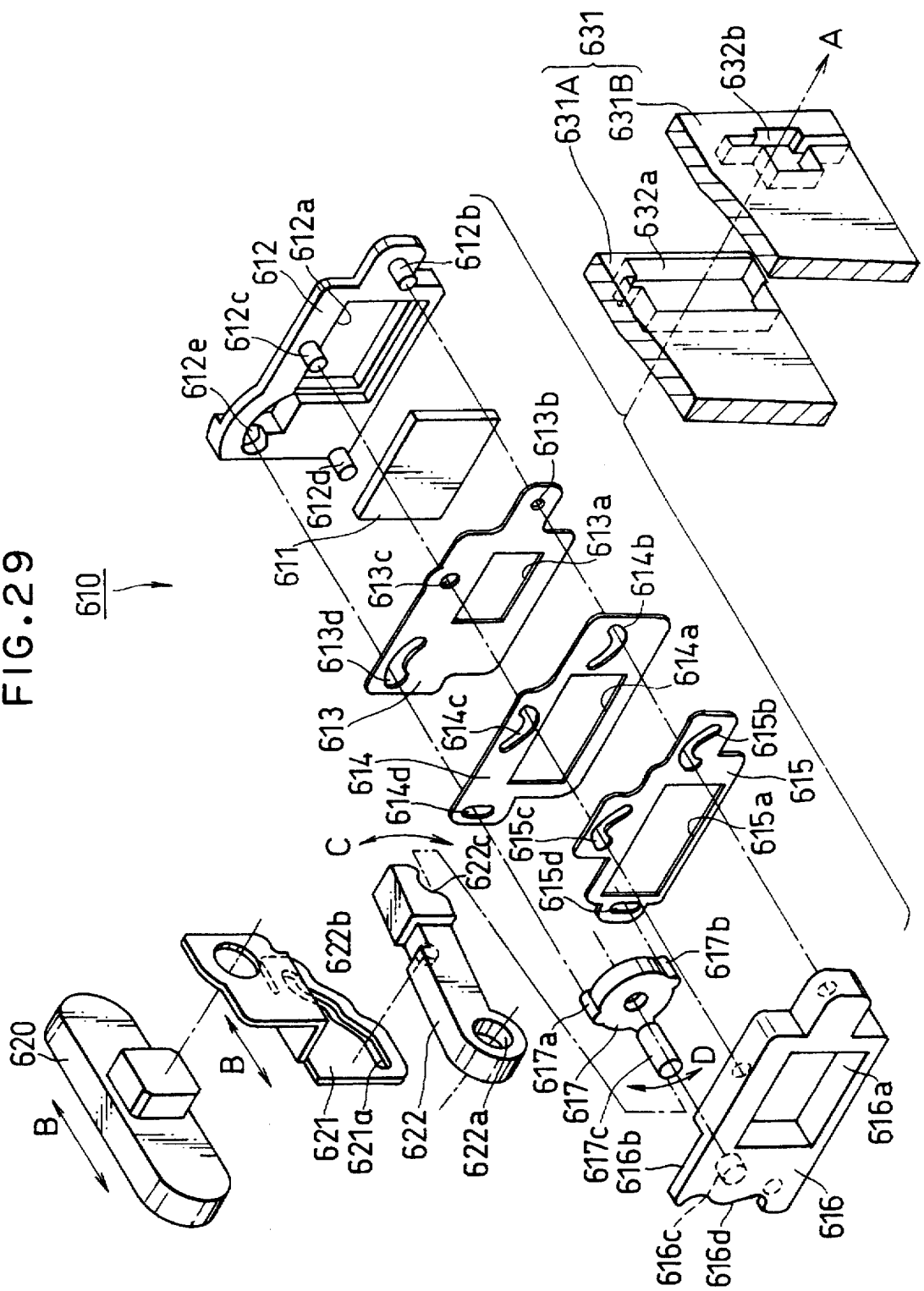
FIG. 29 is an exploded perspective view of a picture frame switching mechanism of a viewfinder according to a sixth embodiment of the present invention as seen slantingly from below.

FIG. 29 is an exploded perspective view of a picture frame switching mechanism of a viewfinder according to the present invention as seen slantingly from below. FIG. 30 is a perspective view of this viewfinder picture frame switching mechanism in the inserted state as seen in the same manner slantingly from below. Accordingly, the upwards direction in FIGS. 29 and 30 is the downwards direction upon the camera. Moreover, FIG. 29 has the same contents as FIG. 25 for the fifth embodiment and the showing direction is different from each other.

Figure 30:
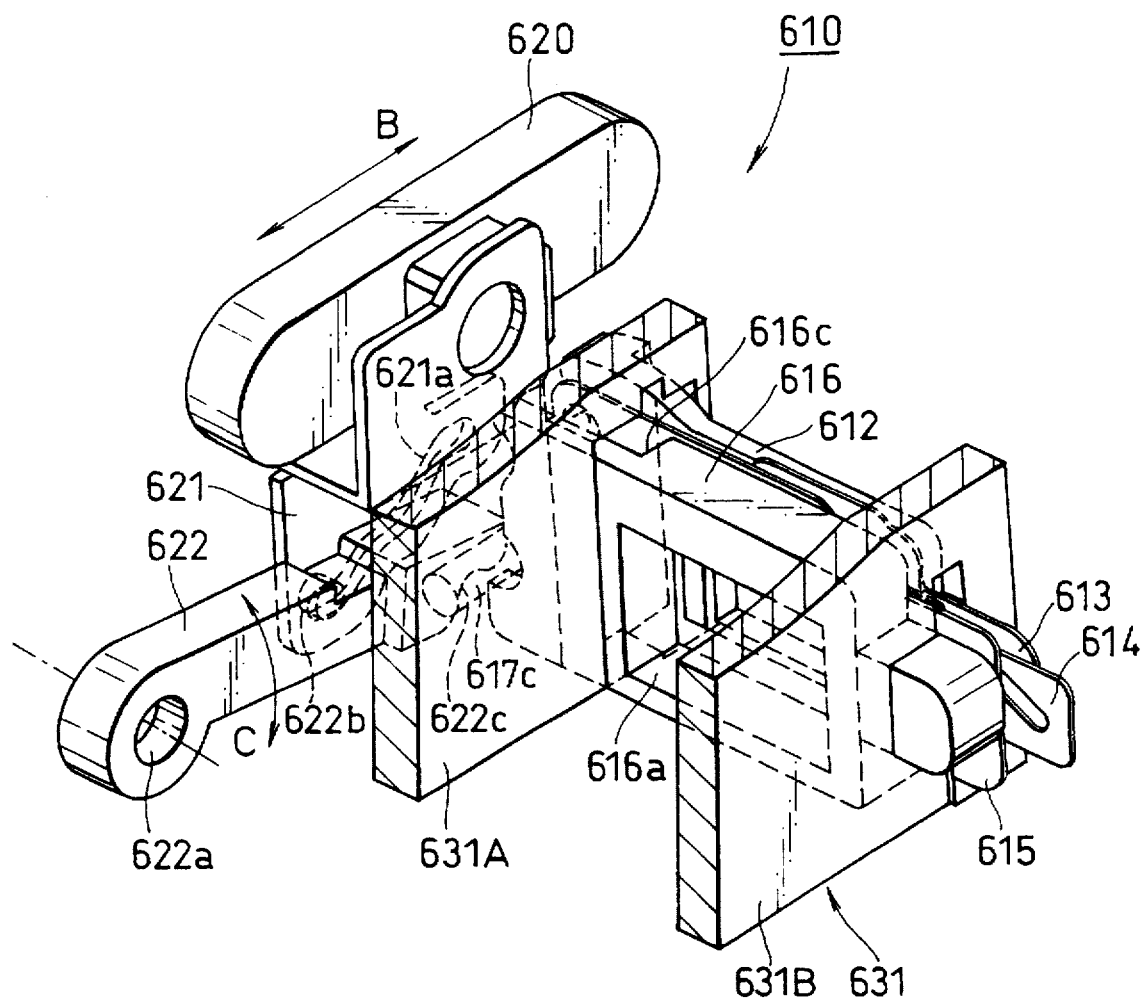
FIG. 30 is a perspective view of the picture frame switching mechanism of the viewfinder of FIG. 29 shown in the assembled state as seen slantingly from below.

In a picture frame switching mechanism 610 of the viewfinder, as shown in FIGS. 29 and 30, the various constructional members are temporarily assembled together into a single unit, and the various constructional members in this temporarily assembled state are inserted from the side through insertion holes 632a and 632b (FIG. 29) which are formed in side wall portions 631A and 631B of a viewfinder block 631 which is included in the housing of the real image type viewfinder 630 shown in FIGS. 31A through 31C which confront one another with a predetermined gap between them, thus the picture frame switching mechanism 610 is assembled into and fixed.

Referring to FIG. 29, this picture frame switching mechanism 610 comprises a focus plate 611 which is disposed upon the viewfinder optical path of the real image type viewfinder 630 at a portion thereof upon which is focused an image of the object to be photographed. This focus plate 611 is gripped and supported by a holder 612 including a support window portion 612a, which constitutes a support member therefor. A picture frame 613 in which an opening 613a of normal size, which corresponds to a viewfinder picture frame for the normal photographic range when the viewfinder is looked through and the aspect ratio of which is a normal picture, is formed is disposed so as to be superimposed against the front surface of this holder 612, and the aforesaid focus plate 611 is held between them. This picture frame 613, together with the holder 612, constitutes a support member for the focus plate 611.

Moreover, in the real image type viewfinder 630, the side of the above described focus plate 611 towards the picture frame 613 is the real image surface.

614 and 615 are mask plates which are arranged on the front surface of the above described picture frame 613 and which switch over the above described viewfinder picture frame, and opening portions 614a and 615a are formed in these mask plates 614 and 615 and serve as frames for picture frame switchover for selectively covering over the upper and lower edge portions, or the left and right edge portions, of the opening 613a in the above described picture frame 613.

616 is a pressure plate which is arranged on the front side so as to press these mask plates 614 and 615 while leaving them free to move, and this pressure plate 616 has holes into which are pressed the projections 612b, 612c, and 612d which are provided in the front surface of the above described holder 612 so as to project therefrom, whereby the pressure plate 616 is unitarily attached to the holder 612 at a fixed gap with respect thereto so as to constitute a mechanical base. An opening 616a of this pressure plate 616 is formed of a size which is set larger than the opening 613a of the above described picture frame 613, so as to be larger than the sizes of the picture frames to which this mechanism 610 is switched over.

In this connection, cam grooves 614b and 615b, and 614c and 615c are formed in the aforesaid mask plates 614 and 615, in order for these mask plates to be moved in the required directions. Two projections 612b and 612c from the projections which are provided as projecting from the aforesaid holder 612 are respectively engaged with by being passed through these cam grooves 614b and 615b, and 614c and 615c. By this, the mask plates 614 and 615 are moved between the holder 612 and the pressure plate 616 in the required directions according to the shapes of the cam grooves 614b and 615b, and 614c and 615c.

Moreover, holes 613b and 613c are opened in the aforesaid picture frame 613 and the projections 612b and 612c fitly pass through them.

617 is a drive member which is disposed between the picture frame 613 and the mask plates 614 and 615 which are superimposed in order on the front side of the holder 612 and the pressure plate 616. This drive member 617 presents a roughly circular plate shape, and is axially supported so as to freely rotate by a shaft portion 616c which is unitarily provided as projecting at a cutaway portion 616b for reception which is formed so that one portion of the above described pressure plate 616 is thin. Further, engagement projections 617a and 617b are provided on the side of this drive member 617 towards the mask plates 614 and 615 at a certain prescribed interval apart in the circumferential direction and projecting in the radially outward direction and in the rearward direction.

These engagement projections 617a and 617b are portions for driving the aforesaid mask plates 614 and 615 in accompaniment with the rotation of this drive member 617, and slots for engagement 614d and 615d are formed in each of the mask plates 614 and 615 for respectively engaging therewith. Moreover, the end of one of the engagement projections 617a is inserted into and engaged with circular arc shaped groove portions 613d and 612e formed in the aforesaid picture frame 613 and holder 612.

An engagement arm portion 617c is provided as projecting from an eccentric position on the side of the pressure plate 616 of the aforesaid drive member 617. This engagement arm portion 617c is formed so as to face in the forward direction from a cutaway portion 616d which is formed on a side portion of the pressure plate 616.

When this sort of drive member 617 is rotationally driven in the clockwise rotational direction in FIG. 29, it drives the mask plate 614 due to its engagement with the engagement projection portion 617a and the slot 614d so as to press it out in the rightwards direction in FIG. 29, and by this the mask plate 614 is shifted along the cam grooves 614b and 614c. In the same manner, when the drive member 617 is rotationally driven in the anticlockwise rotational direction in FIG. 29, the mask plate 615 is shifted so as to be pulled inward in the leftward direction in FIG. 29, and is shifted along the cam grooves 615b and 615c. And the size of the viewfinder picture frame is switched over by the upper and lower edges, or the left and right edge portions, of the focus plate 611 being covered over by the edge portions of the opening portions 614a and 615a of these two mask plates 614 and 615.

The assembly of the picture frame switching mechanism 610 is performed by superimposing in order the above holder 612, the focus plate 611, the picture frame 613, the mask plates 614 and 615, and the pressure plate 616, and by interposing the drive member 617 between the mask plates 614 and 615 and the pressure plate 616 so as to form a temporarily assembled unit, and by then inserting this temporary unit as shown by the arrow A in FIG. 29 into the insertion holes 632a and 632b which are formed in the side wall portions 631A and 631B which define the viewfinder block 631 of the viewfinder 630.

620 is a switchover knob which is exposed on the outside of the camera and which is freely manually operated, and is operated in the direction shown by the arrow B in FIG. 29. 621 is a cam plate which is shifted in the direction shown by the arrow B in FIG. 29 by being linked with this switchover knob 620. A cam groove 621a which is made up from three horizontal grooves and two sloping grooves which link them is formed in this cam plate 621.

622 is a swinging member which freely swings upon a pivot hole 622a thereof which is axially supported upon a shaft which is provided integrally with a camera cover but is not shown in the figure, and an engagement pin 622b which is formed as projecting upon a side portion of this swinging member 622 is engaged into the cam groove 621a of the aforesaid cam plate 621. Accordingly, when the aforesaid cam plate 621 is shifted in the direction of the arrow B in FIG. 29, the engagement pin 622b follows the cam groove 621a with which it is engaged, and the swinging member 622 is pivotally driven in the direction of the arrow C in FIG. 29 about the pivot hole 622a as a rotational center.

An engagement portion 622c which is engaged with the engagement arm portion 617c of the drive member 617 of the picture frame switching mechanism 610 described above is formed at the swinging end of this swinging member 622. And, when in accompaniment with the switching over operation of the aforesaid switch over knob 620 this swinging member 622 is pivoted, the engagement arm portion 617c is raised (is pressed downwards, if it is seen slantingly from below as shown in the figure) by the aforesaid engagement portion 622c as shown by the arrow D in FIG. 29, and due to this the above described drive member 617 comes to be rotationally driven in the anticlockwise direction in FIG. 29.

Now, this drive member 617 is biased in the clockwise direction in FIG. 29 by a spring which is not shown in the figure, and, due to this, this drive member 617 is rotationally driven together with the pivoting operation of the aforesaid swinging member 622, and its drive force comes to be transmitted to the aforesaid mask plates 614 and 615. Moreover, it would also be acceptable for the engagement portion 622c at the swinging end of the swinging member 622 to be formed so as to grip the engagement arm portion 617c of the drive member 617.

The picture frame switching mechanism 610 constituted as described above is temporarily assembled into a single unit, and its state as inserted into a portion of the viewfinder block 631 and fixed is shown in FIG. 30; this FIG. 30 is a figure in which the picture frame switching mechanism 610 is seen slantingly from below.

The switching over of the picture frame of the viewfinder with this picture frame switching mechanism 610 constituted as described above is the same as in the fifth embodiment of FIG. 5, and accordingly its explanation will be curtailed.

FIGS. 31A through 31C show the picture frame switching mechanism 610 for a viewfinder according to this invention in the case that it is fitted to a real image type viewfinder 630 which is used in a camera: FIG. 31A is a schematic sectional view of the essential elements as seen from a direction in the horizontal plane, FIG. 31B is a side view thereof, and FIG. 31C is a rear view.

In these figures, the viewfinder optical system is composed of elements 631 through 648. In this viewfinder optical system, 645 is a mirror and 647 is a prism, and these are arranged as lined up in suitable positions upon a viewfinder optical axis 640 within a viewfinder block 631. Moreover, the construction is such that this viewfinder optical axis 640 is reflected by the mirror 645, a mirror not shown in the figure, the reflecting portion 647a and the like to arrive at an eyepiece portion 650.

Moreover, since this type of real image type viewfinder 630 is one which has a construction which is well known, therefore the explanation of its concrete construction and function and the like herein will be curtailed.

In this connection, the reference numeral 651 in the figure denotes a shaft portion which is fixed to the viewfinder block 631, while 652 and 653 are lens holders which are provided so as to shift along this shaft portion. Zooming of the viewfinder is performed by lenses 641, 642, and 643 which are the viewfinder optical system being suitably driven by these lens holders 652 and 653.

For the viewfinder block 631 of this type of viewfinder 630, the picture frame switching mechanism 610 described above is formed into a unit in a temporarily assembled state, and is inserted from the rear surface side of the viewfinder block 631 and is fixed.

Here, a position which is upon the viewfinder optical axis 640 and can ensure an assembly space, for example, the vicinity of the position of disposition of the prism 647 can be considered as an assembly position for this type of picture frame switching mechanism 610 in this real image type viewfinder 630.

That is to say, according to this sixth embodiment, it is so arranged that the members which constitute the picture frame switching mechanism 610 which is capable of switching over viewfinder picture frames of a plurality of sizes of differing aspect ratios are inserted, in the state of being temporarily assembled together into a unit, into a portion of the viewfinder block 631 of the real image type viewfinder 630, and are fixed.

To express it in other words, it is arranged that it is possible temporarily in advance to assemble all of the constructional parts which constitute the picture frame switching mechanism 610 into a unit, and the assembly of the picture frame switching mechanism 610 to the viewfinder 630 is performed by inserting this unit into a specific place of the viewfinder block 631, i.e., with the real image type viewfinder 630, into insertion holes 632a and 632b which are provided in the side wall portions 631A and 631B in the vicinity of the real image surface. And, according to this picture frame switching mechanism 610 which can be assembled by simple insertion into a specified place of the viewfinder block 631 in this manner, it is possible positionally to displace the mask plates 614 and 615 and so on when switching over the picture frame in a required condition in which there is no occurrence of play or the like, and it is possible reliably to switch over the viewfinder picture frame to suitable sizes which have different aspect ratios.

In particular, according to this type of construction, it is possible to manufacture the picture frame switching mechanism 610 according to a simple construction, and its assembly can be performed easily, and moreover it is possible to assemble it simply within the viewfinder block.

Moreover, the present invention is not limited to the construction of the above described sixth embodiment; the form and the construction and the like of the various parts of the viewfinder 630 and the switching mechanism 610 for the viewfinder picture frame may be varied and changed as is suitable. For example, although with the above described sixth embodiment the case of application of the present invention to the real image type viewfinder 630 was shown by way of example, the present invention is not limited to this case, and it can also be applied to a viewfinder of any suitable type. That is to say, the present invention can be applied to any kind of viewfinder, provided that it has a construction in which the members which constitute the picture frame switching mechanism 610 for the viewfinder can be inserted in the superimposed state into the viewfinder block 631 in the vicinity of a surface of a real image of the object to be photographed and can be fixed.

Although the above explanations relating to the first through the sixth embodiments have been made in terms of a camera, the present invention is not limited to a camera; it can also be utilized for switching over the picture frame in various other optical devices.

We claim:

1. A picture frame switching mechanism, comprising:

a plurality of picture frame definition members whose relative position in a plane perpendicular to an optical axis of an optical system is changed so as to switch picture frames;

a first portion of one of said picture frame definition members receiving driving force from a drive section which drives some of said plurality of picture frame definition members; and a second portion of said one picture frame definition member forming a linked driving section which drives others of said picture frame definition members in linkage according to predetermined conditions with operation of said drive section.

2. A picture frame switching mechanism according to claim 1, wherein said optical system is a viewfinder optical system which is provided separately from a photographic optical system of a camera.

3. A picture frame switching mechanism according to claim 1, wherein said picture frame definition members are made from a light reducing material.

4. A picture frame switching mechanism according to claim 1, wherein:

said plurality of picture frame definition members includes a first definition member which defines a picture frame related to a first direction perpendicular to an optical axis of said optical system, and a second definition member which defines a picture frame related to a second direction perpendicular to both of said optical axis and said first direction;

a reference picture frame is defined when said first definition member is in a first standard position and said second definition member is in a second standard position;

said drive section is provided so as to drive said first definition member to and fro in said first direction; and said linked driving section keeps said second definition member at said second standard position or farther from said optical axis than said second standard position when said first definition member approaches to said optical axis closer than said first standard position, and brings said second definition member closer to said optical axis than said second standard position when said first definition member is at said first standard position or farther from said optical axis than said first standard position.

5. A picture frame switching mechanism according to claim 4, further comprising
a standard frame determination member which fixes a position of said picture frame in relation to said first direction at a position corresponding to said first standard position when said first determination member is at said first standard position or farther out than said first standard position, and fixes a position of said picture frame in relation to said second direction at a position corresponding to said second standard position when said second determination member is at said second standard position or farther out than said second standard position.

6. A picture frame switching mechanism according to claim 4, wherein said first definition member and said second definition member are each provided as a pair symmetrical with respect to said optical axis, and said drive section drives to and fro the pair of first definition members along said first direction in mutually opposite directions.

7. A picture frame switching mechanism according to claim 4, wherein said linked driving section comprises a cam mechanism which treats said first definition member as a driver and said second definition member as a follower.

8. A picture frame switching mechanism according to claim 5, wherein said plurality of picture frame definition members switches between three picture frames: a first picture frame which is formed when said first definition member is at said first standard position or farther from said optical axis than said first standard position and said second definition member is at said second standard position or farther from said optical axis than said second standard position, a second picture frame which is formed when said first definition member is at said first standard position or farther from said optical axis than said first standard position and said second definition member is in a vicinity of said optical axis, and a third picture frame which is formed when said first definition member is in a vicinity of said optical axis and said second definition member is at said second standard position or farther from said optical axis than said second standard position.

9. A picture frame switching mechanism, comprising:
a pair of L-shaped picture frame definition members which are opposingly disposed along the diagonal direction of a rectangular shaped picture frame; and
a guide member which guides said picture frame definition members so as to change said picture frame over between a plurality of types by displacing said picture frame definition members in mutually opposite directions in a plane parallel to said picture frame, and by changing the directions of displacement of said pair of picture frame definition members en route of their respective displacements.

10. A picture frame switching mechanism according to claim 9, wherein said picture frame definition members and said guide member are provided to a viewfinder optical system which is provided separately from a photographic optical system of a camera.

11. A picture frame switching mechanism according to claim 9, wherein said picture frame definition members are made from a light reducing material.

12. A picture frame switching mechanism according to claim 9, wherein said guide member displaces said pair of picture frame definition members from a predetermined standard position for said pair of picture frame definition members, on a one side parallel to one side of said picture frame, and on another side perpendicular to said one side of said picture frame.

13. A picture frame switching mechanism according to claim 12, wherein said pair of picture frame definition members switches between three picture frames: a first picture frame which is defined by said predetermined standard position of said pair of picture frame definition members, a second picture frame which is defined when said pair of picture frame definition members have been displaced parallel to said one side of said picture frame from said predetermined standard position, and a third picture frame which is defined when said pair of picture frame definition members have been displaced perpendicular to said one side of said picture frame from said predetermined standard position.

14. A picture frame switching mechanism, comprising:
a first picture frame definition member which defines a rectangular shaped first picture frame; and
a second picture frame definition member which is provided so as to be shiftable between an encroaching position in which said second picture frame definition member encroaches into said first picture frame by being superimposed in a direction of an optical axis upon said first picture frame definition member and a withdrawn position in which said second picture frame definition member is withdrawn outside from one side of said first picture frame, and in said encroaching position defines a second picture frame by narrowing down said first picture frame in a first direction parallel to said one side, and when shifted to a central stopping position between said encroaching position and said withdrawn position defines a third picture frame along with said first picture frame definition member by narrowing down said first picture frame in a second direction which is perpendicular to said first direction.

15. A picture frame switching mechanism according to claim 14, wherein:
said first picture frame definition member and said second picture frame definition member are provided to a viewfinder optical system which is provided separately from a photographic optical system of a camera; and
said second direction is set in a direction which differs from a direction in which said photographic optical system and said viewfinder optical system are lined up.

16. A picture frame switching mechanism according to claim 14, wherein said picture frame definition members are made from a light reducing material.

17. A picture frame switching mechanism according to claim 14, wherein:
a movable definition portion, which defines another side parallel to said side of said first picture frame and which can be shifted in said second direction, is provided to said first picture frame definition member; and
a third picture definition portion for defining in said central stopping position a side of said third picture frame prolonged in said first direction is provided to an edge portion of said encroaching position side of said second picture frame definition member, and comprising
a shifting mechanism which shifts said movable definition portion more towards a picture frame center when said second picture frame definition member has been shifted into said central stopping position than when said second picture frame definition member is in said withdrawn position or in said encroaching position.

18. A picture frame switching mechanism according to claim 17, wherein said shifting mechanism is constituted by a cam mechanism which is provided between said second picture frame definition member and said first picture frame definition member.

19. A picture frame switching mechanism according to claim 18, wherein said cam mechanism comprises a first cam which is swung in a direction in linked movement with shifting of said second picture frame definition member and which changes a swinging movement direction in reverse at said central stopping position, and a second cam which causes to and fro linked movement of said movable definition portion in said second direction in correspondence to said swinging movement direction of said first cam.

20. A picture frame switching mechanism, comprising:
a picture frame switching member which is inserted into an optical path of an optical system; and
a guide mechanism which guides said picture frame switching member according to a predetermined guiding order between a first position corresponding to a first picture frame which is of rectangular shape, a second position corresponding to a second picture frame which is squeezed only in a direction following along short sides of said first picture frame, and a third position corresponding to a third picture frame which is squeezed only in a direction following along long sides of said first picture frame, and which performs switching between said second position and said third position not via said first position.

21. A picture frame switching mechanism according to claim 20, wherein said optical system is a viewfinder optical system which is provided separately from a photographic optical system of a camera.

22. A picture frame switching mechanism according to claim 20, wherein said picture frame definition member is made from a light reducing material.

23. A picture frame switching mechanism according to claim 20, further comprising a drive member which is rotationally operated around a rotational axis line which is parallel to a direction of an optical axis of said optical system and which drives said guide mechanism, wherein said rotational axis line of said drive member is set outside said picture frame.

24. A picture frame switching mechanism according to claim 20, wherein said guide mechanism is formed so that: said picture frame switching member shifts between said first position and said third position via said second position; and positions of said picture frame switching member in said direction following along said short sides are the same for said first position and for said third position.

25. A picture frame switching mechanism according to claim 20, wherein said guide mechanism is formed so that: said picture frame switching member shifts between said first position and said second position via said third position; and positions of said picture frame switching member in said direction following along said long sides are the same for said first position and for said second position.

26. A picture frame switching mechanism comprising:
a picture frame definition member which is inserted into an optical path of an optical system and which defines a first picture frame of rectangular shape;
a picture frame switching member which includes a second picture frame defining edge parallel to long sides of said first picture frame and a third picture frame defining edge parallel to short sides of said first picture frame; and
a guide mechanism which guides said picture frame switching member according to a predetermined guiding order between a first position in which both said second picture frame defining edge and said third picture frame defining edge are withdrawn to outside of said first picture frame, a second position in which said second picture frame defining edge is encroached more to inside than the long sides of said first picture frame while said third picture frame defining edge is withdrawn to outside of said first picture frame, and a third position in which said third picture frame defining edge is encroached more to inside than the short sides of said first picture frame while said second picture frame defining edge is withdrawn to outside of said first picture frame, and which performs switching between said second position and said third position not via said first position.

27. A picture frame switching mechanism according to claim 26, wherein said guide mechanism is formed so that: said picture frame switching member shifts between said first position and said third position via said second position; and an amount of drawing back of said third picture frame defining edge from the short sides of said first picture frame is gradually reduced according to approaching from said first position to said second position.

28. A picture frame switching mechanism according to claim 26, wherein said guide mechanism shifts said picture frame switching member between said first position and said third position via said second position, and moreover is formed so that the positions of said picture frame switching member in a direction following along said short sides are almost the same for said first position and for said third position.

29. A picture frame switching mechanism according to claim 26, wherein said guide mechanism is formed so that: said picture frame switching member shifts between said first position and said second position via said third position; and positions of said picture frame switching member in a direction following along said long sides are almost the same for said first position and for said second position.

30. A picture frame switching mechanism comprising:
a picture frame switching member which is inserted into an optical path of an optical system and which switches between a plurality of picture frames;
a drive member which, in a state of being engaged with said picture frame switching member, is rotationally operated around a rotational axis which is set outside said picture frame and parallel to a direction of an optical axis of said optical system;
a guide mechanism which shifts said picture frame switching member between a plurality of positions respectively corresponding to said plurality of picture frames in linking with a rotation of said drive member; and a click mechanism which restricts said drive member into said plurality of positions respectively corresponding to said plurality of picture frames.

31. A picture frame switching mechanism according to claim 30, wherein said click mechanism is provided between a member which rotatably supports said drive member and said drive member.

32. A picture frame switching mechanism according to claim 4, wherein said linked driving section defines a first picture frame when said first definition member is in said first standard position and said second definition member is in said second standard position, defines a second picture frame when said first definition member is in said first standard position and said second definition member is closer to said optical axis than said second standard position, and defines a third picture frame when first definition member is closer to said optical axis than said first standard position and said second definition member is in said second standard position.

33. A picture frame switching mechanism according to claim 13, wherein:

said guide member includes a drive member which drives said pair of picture frame definition members, and a guide plate which guides said pair of picture frame definition members;

each of said pair of picture frame definition members includes a projection portion;

said guide plate has guide grooves into which said projection portions are engaged;

each of said guide grooves successively has a first guide portion which displaces said pair of picture frame definition members in a direction parallel to said one side, and a second guide portion which displaces said pair of picture frame definition members in a direction perpendicular to said one side; and said pair of picture definition members defines said first picture frame by being positioned in said predetermined standard position when said projection portions are in portions of said guide grooves intermediate between said first guide portions and said second guide portions, defines said second picture frame by being driven by said drive member so that said projection portions are shifted into said first guide portions, and defines said third picture frame by being driven by said drive member so that said projection portions are shifted into said second guide portions.

34. A camera comprising:

a variable magnification optical system in which a magnification of a viewfinder can be altered; and a picture frame switchover member which is inserted into and removed from an optical path of said viewfinder so as to switch over a picture frame of said viewfinder, wherein a region for retraction of said picture frame switchover member to outside said optical path is arranged in a direction perpendicular to an optical path of said variable magnification optical system with regard to an operation region for variable magnification of said variable magnification optical system.

35. A camera according to claim 34, wherein:

said viewfinder is a real image type viewfinder;

a real image surface of said viewfinder is provided in an image space side of said variable magnification optical system and in parallel to the optical axis of said variable magnification optical system; and said picture frame switchover member is shifted in a direction parallel to said real image surface to switch over said picture frame.

36. A camera according to claim 34, wherein:

constructional elements other than constructional components of said viewfinder are arranged in the direction perpendicular to the optical axis of said variable magnification optical system with regard to said operation region for variable magnification; and said region for retraction of said picture frame switchover member is set between said constructional elements and said variable magnification optical system.

37. A camera according to claim 34, wherein:

said constructional components of said viewfinder are assembled to a viewfinder block that is attachable to and detachable from a camera body; and said region for retraction of said picture frame switchover member is set in a position outside said viewfinder block and adjacent to the operation region for variable magnification of said variable magnification optical system which is set inside said viewfinder block.

38. A camera according to claim 36, wherein said constructional elements are constructional components of a distance measurement means which measures a distance to an object to be photographed.

39. A camera according to claim 36, wherein a guide member which guides a shift element of said variable magnification optical system is arranged between said constructional elements and said operation region for variable magnification.

40. A viewfinder comprising a picture frame switching mechanism which is capable of switching over a viewfinder picture frame to a plurality of sizes, and in which a viewfinder optical system is contained within a viewfinder block, wherein, said picture frame switching mechanism is inserted and fixed into a portion of said viewfinder block in a state that members which constitute said picture frame switching mechanism are temporarily assembled into a unit.

41. A viewfinder according to claim 40, wherein said picture frame switching mechanism comprises a focal point plate upon which an image of an object to be photographed is focused, a mask plate having a cam portion, a drive member which is rotationally driven for shifting said mask plate, a holding member for holding said focal point plate, and a pressure member which presses said mask plate by being assembled to this holding member with a predetermined gap therebetween.

42. A viewfinder according to claim 40, wherein:

said viewfinder is a real image type viewfinder; and said picture frame switching mechanism is disposed in a vicinity of a real image plane of said real image type viewfinder.

43. A viewfinder according to claim 41, wherein:

said picture frame switching mechanism is temporarily assembled into a single unit by superimposing together and assembling said focal point plate, said mask plate, and said drive member between said holding member and said pressure member which is assembled to said holding member with a predetermined gap therebetween; and said temporarily assembled picture frame switching mechanism is inserted and fixed into insertion portions which are provided in a pair of wall portions which are included in the viewfinder block.

44. A viewfinder in which a viewfinder optical system is held within a viewfinder block, produced by a process which comprises:

a step of temporarily assembling into a single unit members which constitute a picture frame switching mechanism which switches over a viewfinder picture frame to a plurality of sizes; and a step of inserting and fixing said temporarily assembled picture frame switching mechanism into a portion of said viewfinder block.

* * * * *